(12) United States Patent
Lupo et al.

(10) Patent No.: US 11,374,412 B2
(45) Date of Patent: Jun. 28, 2022

(54) FURNITURE POWER MANAGEMENT SYSTEM

(71) Applicant: PARKER HOUSE MFG. CO., INC., Chino, CA (US)

(72) Inventors: Christopher John Lupo, Chino Hills, CA (US); Lorin Kenneth Rosenthal, Chino Hills, CA (US); Aaron R London, Los Alamitos, CA (US); Lindon Alford Baker, Yorba Linda, CA (US)

(73) Assignee: PARKER HOUSE MFG. CO., INC., Chino, CA (US)

( * ) Notice: Subject to any disclaimer, the term of this patent is extended or adjusted under 35 U.S.C. 154(b) by 215 days.

(21) Appl. No.: 15/954,584

(22) Filed: Apr. 16, 2018

(65) Prior Publication Data

US 2018/0301918 A1 Oct. 18, 2018

Related U.S. Application Data

(60) Provisional application No. 62/485,759, filed on Apr. 14, 2017.

(51) Int. Cl.
*H02J 7/00* (2006.01)
*G10L 15/22* (2006.01)
(Continued)

(52) U.S. Cl.
CPC ............ *H02J 7/00* (2013.01); *A47C 7/72* (2013.01); *G10L 15/22* (2013.01); *H02J 7/0072* (2013.01);
(Continued)

(58) Field of Classification Search
CPC .......... H02J 7/00; H02J 7/0072; H02J 7/0047; A47C 7/72; A47C 7/725; A47C 31/008;
(Continued)

(56) References Cited

U.S. PATENT DOCUMENTS 5,272,386 A * 12/1993 Kephart .................. H02J 9/002
 307/10.1
5,349,162 A * 9/1994 Rolling .................... F24C 7/082
 219/445.1

(Continued)

FOREIGN PATENT DOCUMENTS

CN 202076818 U 12/2011
CN 202949097 U 5/2013
(Continued)

OTHER PUBLICATIONS

Autosystempro,"Automotive Electricity and Electronics—Regulation"pp. 1-16, (Year: 2006).*
(Continued)

*Primary Examiner* — Pinping Sun
(74) *Attorney, Agent, or Firm* — Marshall Lerner; Steven Kim; Kleinberg & Lerner LLP.

(57) ABSTRACT

A power source resident in furniture provides power to at least one charging port or socket used to provide power to an electronic device. The furniture may be an articulated furniture having at least one motor. The furniture may have at least one type of switch that manages the power to the charging port. The switch may reduce wasted energy consumption due to heat lost at the charging port.

45 Claims, 14 Drawing Sheets

(51) Int. Cl.
  *A47C 7/72* (2006.01)
  *H02P 29/00* (2016.01)
  *F21V 33/00* (2006.01)
  *A47C 31/00* (2006.01)
  *A47C 7/74* (2006.01)
  *A47C 1/02* (2006.01)
  *A47C 3/20* (2006.01)
  *A47C 7/50* (2006.01)
  *A47C 7/68* (2006.01)

(52) U.S. Cl.
  CPC .......... *A47C 1/02* (2013.01); *A47C 3/20* (2013.01); *A47C 7/506* (2013.01); *A47C 7/68* (2013.01); *A47C 7/725* (2013.01); *A47C 7/742* (2013.01); *A47C 7/748* (2013.01); *A47C 31/008* (2013.01); *F21V 33/0012* (2013.01); *G10L 2015/223* (2013.01); *H02J 7/0047* (2013.01); *H02P 29/00* (2013.01)

(58) Field of Classification Search
  CPC .......... A47C 7/748; A47C 7/742; A47C 1/02; A47C 3/20; A47C 7/506; A47C 7/68; G10L 15/22; G10L 2015/223; H02P 29/00; F21V 33/0012
  See application file for complete search history.

(56) References Cited

U.S. PATENT DOCUMENTS

| | | | |
|---|---|---|---|
| 6,211,581 B1 | 4/2001 | Farrant | |
| 6,295,002 B1* | 9/2001 | Fukuda | G08B 29/181 340/636.1 |
| 6,459,896 B1* | 10/2002 | Liebenow | H04M 1/72519 455/423 |
| 6,780,048 B2 | 8/2004 | Chen et al. | |
| 6,923,684 B2 | 8/2005 | Strayer | |
| 6,946,817 B2 | 9/2005 | Fischer et al. | |
| 7,074,091 B2* | 7/2006 | Strayer | H01R 25/006 439/131 |
| 7,099,693 B2* | 8/2006 | Shin | H04W 52/0225 455/557 |
| 7,268,518 B1* | 9/2007 | Goff | H02J 7/0042 320/107 |
| 7,426,126 B1 | 9/2008 | Lai | |
| 7,479,762 B2 | 1/2009 | Bayne et al. | |
| 7,663,338 B2 | 2/2010 | Guthrie et al. | |
| 7,663,866 B2 | 2/2010 | Lee et al. | |
| 7,960,648 B2 | 6/2011 | McGinley et al. | |
| 7,969,506 B2 | 6/2011 | Cheng et al. | |
| 7,977,813 B2* | 7/2011 | Bakken | E02F 9/2095 307/9.1 |
| 7,994,654 B2 | 8/2011 | Lee et al. | |
| 8,106,541 B1 | 1/2012 | Sarullo | |
| 8,127,126 B2 | 2/2012 | Lai | |
| 8,271,815 B2 | 9/2012 | Lin et al. | |
| 8,283,899 B2 | 10/2012 | Esnard et al. | |
| 8,384,348 B2 | 2/2013 | Tin | |
| 8,427,283 B2 | 4/2013 | Lee et al. | |
| 8,469,746 B2 | 6/2013 | Kemp | |
| 8,508,188 B2 | 8/2013 | Murtha et al. | |
| 8,571,608 B2 | 10/2013 | Esnard et al. | |
| 8,581,708 B2 | 11/2013 | Lee | |
| 8,627,122 B2 | 1/2014 | Lu | |
| 8,783,936 B2 | 7/2014 | Chien | |
| 8,816,644 B2 | 8/2014 | Pisharodi | |
| 8,823,318 B2 | 9/2014 | Liu et al. | |
| 8,998,462 B2 | 4/2015 | Chien | |
| D730,835 S | 6/2015 | Murphy et al. | |
| 9,048,570 B2 | 6/2015 | Goel | |
| 9,071,077 B2 | 6/2015 | Eastlack | |
| 9,087,345 B2 | 7/2015 | Liu et al. | |
| 9,093,848 B2 | 7/2015 | Miller et al. | |
| 9,161,464 B2 | 10/2015 | Liao | |
| 9,184,603 B2 | 11/2015 | Lee | |
| 9,184,608 B2 | 11/2015 | Esnard et al. | |
| 9,219,339 B2 | 12/2015 | Lai | |
| 9,235,247 B2 | 1/2016 | Chan | |
| 9,313,788 B2 | 4/2016 | Fudickar et al. | |
| 9,396,897 B1 | 7/2016 | Ademola | |
| 9,431,844 B2 | 8/2016 | Redding | |
| 9,450,441 B2 | 9/2016 | Han et al. | |
| 9,478,927 B1 | 10/2016 | Shen | |
| 9,488,364 B2 | 11/2016 | Chien | |
| 9,490,664 B2 | 11/2016 | Lo et al. | |
| 9,490,998 B1* | 11/2016 | Danciu | H04L 67/142 |
| 9,496,732 B2 | 11/2016 | Partovi | |
| 9,509,151 B2 | 11/2016 | Lee et al. | |
| 9,544,323 B2 | 1/2017 | Porcello et al. | |
| 9,557,791 B2 | 1/2017 | Hsieh et al. | |
| 9,559,472 B2 | 1/2017 | Chien | |
| 9,590,441 B2 | 3/2017 | Bajpai et al. | |
| 9,893,542 B2 | 2/2018 | Hwang et al. | |
| 9,963,166 B2* | 5/2018 | Xu | B60L 1/00 |
| 10,992,164 B2* | 4/2021 | Lebreux | H02J 7/0026 |
| 2003/0117019 A1* | 6/2003 | Furukawa | B60L 58/20 307/10.6 |
| 2004/0026998 A1* | 2/2004 | Henriott | A47B 21/06 307/9.1 |
| 2004/0221181 A1 | 11/2004 | Yu | |
| 2005/0264262 A1* | 12/2005 | Kang | H02J 7/00 320/125 |
| 2007/0072476 A1 | 3/2007 | Milan | |
| 2007/0124614 A1 | 5/2007 | Lee et al. | |
| 2008/0012423 A1 | 1/2008 | Mimran | |
| 2008/0265834 A1 | 10/2008 | Lin et al. | |
| 2008/0290731 A1* | 11/2008 | Cassidy | H02M 3/335 307/35 |
| 2009/0102426 A1 | 4/2009 | Liou et al. | |
| 2009/0108813 A1 | 4/2009 | Shen et al. | |
| 2009/0215319 A1 | 8/2009 | Gandhi | |
| 2010/0044195 A1 | 2/2010 | Chiang et al. | |
| 2010/0233989 A1* | 9/2010 | Constien | G06F 1/3203 455/343.1 |
| 2011/0199041 A1 | 8/2011 | Yang | |
| 2011/0248650 A1* | 10/2011 | Sterling | H01R 12/7005 315/307 |
| 2011/0282509 A1 | 11/2011 | Yegin et al. | |
| 2011/0285343 A1 | 11/2011 | Weng | |
| 2011/0287665 A1 | 11/2011 | Chien | |
| 2012/0019392 A1 | 1/2012 | Yamamoto et al. | |
| 2012/0153747 A1* | 6/2012 | Lu | H02J 7/0036 307/131 |
| 2012/0194124 A1 | 8/2012 | Toivola et al. | |
| 2012/0278640 A1 | 11/2012 | Caglianone | |
| 2012/0330538 A1* | 12/2012 | Spjuth | F02N 11/0866 701/113 |
| 2013/0043826 A1 | 2/2013 | Workman et al. | |
| 2013/0049680 A1 | 2/2013 | Katsumata | |
| 2013/0181660 A1 | 7/2013 | Zhou | |
| 2013/0234481 A1 | 9/2013 | Johnson | |
| 2013/0300365 A1 | 11/2013 | Xu | |
| 2013/0335010 A1 | 12/2013 | Wu et al. | |
| 2013/0339766 A1 | 12/2013 | Chen et al. | |
| 2014/0036560 A1* | 2/2014 | Satyamoorthy | H02J 5/005 363/126 |
| 2014/0111143 A1 | 4/2014 | Sells et al. | |
| 2014/0152068 A1* | 6/2014 | Hille | H02P 4/00 297/362.11 |
| 2014/0159478 A1* | 6/2014 | Ang | B60L 1/00 307/9.1 |
| 2014/0159618 A1* | 6/2014 | Hille | H02P 7/04 318/15 |
| 2014/0164798 A1 | 6/2014 | Zhang et al. | |
| 2014/0308995 A1 | 10/2014 | Wu | |
| 2014/0312691 A1 | 10/2014 | Doljack et al. | |
| 2015/0022154 A1 | 1/2015 | Kim | |
| 2016/0025316 A1 | 1/2016 | Chien | |
| 2016/0070324 A1 | 3/2016 | Emby et al. | |
| 2016/0072323 A1 | 3/2016 | Miller et al. | |
| 2016/0091196 A1 | 3/2016 | Chien | |
| 2016/0111914 A1 | 4/2016 | Willard et al. | |

(56) References Cited

U.S. PATENT DOCUMENTS

| | | | |
|---|---|---|---|
| 2016/0153650 A1 | 6/2016 | Chien | |
| 2016/0229434 A1* | 8/2016 | Brousseau | G01S 19/14 |
| 2016/0234356 A1* | 8/2016 | Thomas | H05K 9/0069 |
| 2017/0005509 A1 | 1/2017 | Saloranta | |
| 2017/0012448 A1 | 1/2017 | Miller et al. | |
| 2017/0054315 A1 | 2/2017 | Chien | |
| 2017/0104297 A1 | 4/2017 | Scott et al. | |
| 2017/0196350 A1* | 7/2017 | Saltalamacchia | A46B 5/02 |
| 2017/0332804 A1* | 11/2017 | Rom | A47C 7/24 |
| 2018/0026462 A1 | 1/2018 | Von Novak, III et al. | |
| 2018/0370366 A1* | 12/2018 | Suzuki | H01M 8/0494 |

FOREIGN PATENT DOCUMENTS

| | | | |
|---|---|---|---|
| CN | 203387208 U | | 1/2014 |
| CN | 203691018 U | * | 7/2014 |
| CN | 104682506 A | | 6/2015 |
| CN | 204536984 U | | 8/2015 |
| CN | 104882945 A | | 9/2015 |
| CN | 105449802 A | | 3/2016 |
| CN | 105768679 A | | 7/2016 |
| DE | 202014002446 U1 | | 9/2014 |
| EP | 2290759 A1 | | 3/2011 |
| GB | 2525144 A | | 10/2015 |
| JP | 2002354878 A | * | 12/2002 |
| KR | 20160127982 A | | 11/2016 |
| WO | 2006101683 A2 | | 9/2006 |
| WO | WO-2012160948 A1 * | 11/2012 | ........ H04M 1/72536 |

OTHER PUBLICATIONS

Maxim integrated:"glossary definition for quiescent," pp. 1-2 (Year: NA).*

Aleksandras_Kaknevicius,"When to use load switches in place of discrete MOSFETs," pp. 1-5 (Year: 2016).*

* cited by examiner

FURNITURE POWER MANAGEMENT SYSTEM

RELATED U.S. APPLICATION DATA

This application claims the priority to the U.S. Provisional Application No. 62/485,759 filed on Apr. 14, 2017 which the entire content of which is incorporated by reference herein.

FIELD OF THE INVENTION

The invention disclosed herein is an article of furniture, and in particular, a powered furniture having at least one charging port or socket and at least one power management switch used to conserve energy. The furniture may be a motorized articulated furniture, such as a recliner. The charging port may be a Uniform Serial Bus ("USB") port used to power a first device such as, but not limited to, a tablet or mobile phone for either use or charging. The articulated furniture may include a resident, dedicated battery. In one basic embodiment, the power switch may simply cut-off the power only to the charging port. In another embodiment, the power switch may have an integrated power management system that may be programmed to provide power for a specified duration for a predetermined time or for customized charge time, to selectively lower or raise the current to the charging port, along with having an override cut-off or reduced current function that may be initiated by the user or automatically occur upon removal of the device or charging cord or when the current output of the device has dropped as the device becomes fully charged. The power management control may be manual or automatic, and may be accessed remotely by both a user or a network server.

DESCRIPTION OF THE RELATED ART

The related art may include the following:

a. U.S. Pat. No. 9,182,799 B2 ("Cheng"), Cheng discloses a USB on-the-go device capable of automatically switching the device between a self-power mode and a bus-power mode. Cheng, at the very least, does not disclose an ON/OFF power switch for the USB or use of the USB in connection with furniture.

b. Motorized, articulated furniture which may include a resident, dedicated battery and a USB port or socket, but no ON/OFF switch for the USB port or socket. The USB port or socket consumes power quiescently to heat loss so long as power is allowed to be directed into the USB port or socket. In the market, the retailer, manufacturer, and end user may waste a considerable amount of energy from quiescent current of this type of USB port or socket of a motorized articulated furniture. Products having a rechargeable battery may experience full discharge within 4 days from the USB port's quiescent current alone and thus require more frequent recharging.

The power switch and the various embodiments of the present invention are used to limit either wasted energy consumption by turning off or lowering the power supplied to a charging port or socket to reduce quiescent current discharge for both energy conservation and when power must be reserved for articulating a component of a furniture.

SUMMARY OF THE INVENTION

A power source resident in furniture provides power to at least one charging port or socket which is used in turn to power an electronic first device such as mobile phone or tablet. The furniture may also divert some power to second electronic device such as a motor used to articulate a portion of the furniture. The furniture may have at least one type of switch that manages the power to the charging port and reduces wasted energy consumption due to unnecessary heat loss at the charging port.

The charging port may be part of a charging module comprising also a charging power supply and a charging power switch. The charging module may comprise a power indicator or notification system. The power switch may be a simple ON/OFF switch or it may be, but not limited to, a remotely controlled automated system that is able to intelligently manage the power to the charging port based on the connected first device's needs and the power requirements of the articulated furniture.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

The present invention includes furniture having a least one charging module comprising a charging power supply and charging port. The charging module provides power to at least one first device and may be used to power a first device or recharge the battery of the first device. Further to the invention, the charging module has a charging power switch which controls the current supplied to the charging power supply from a power source. The power source may be a wall outlet or a furniture battery or both. The furniture may be any type of furniture which may include static furniture or motorized, articulated furniture, such as a recliner.

Figure 1:
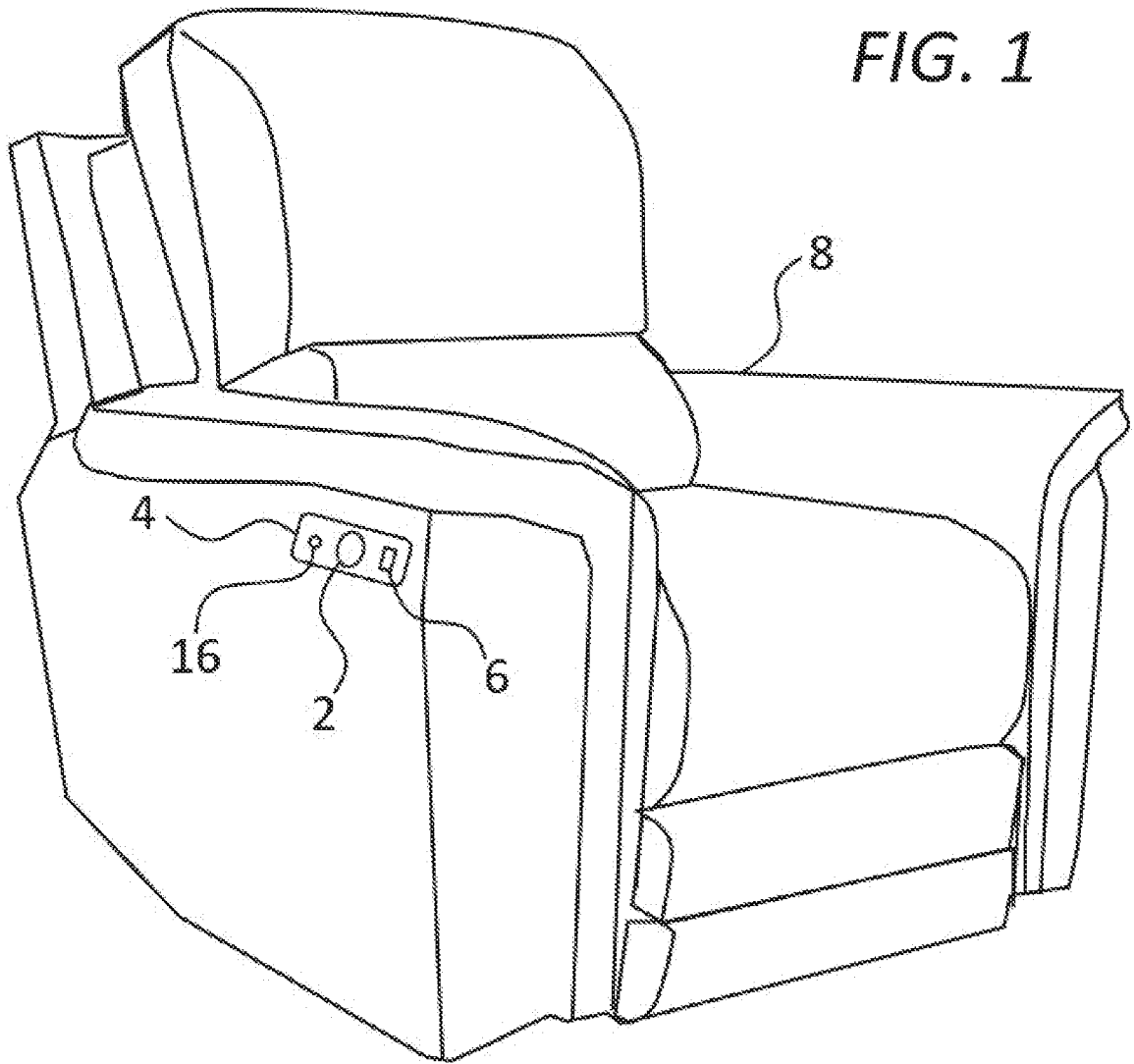
FIG. 1 is an embodiment of a recliner that includes a charging port and control panel.
Figure 2:
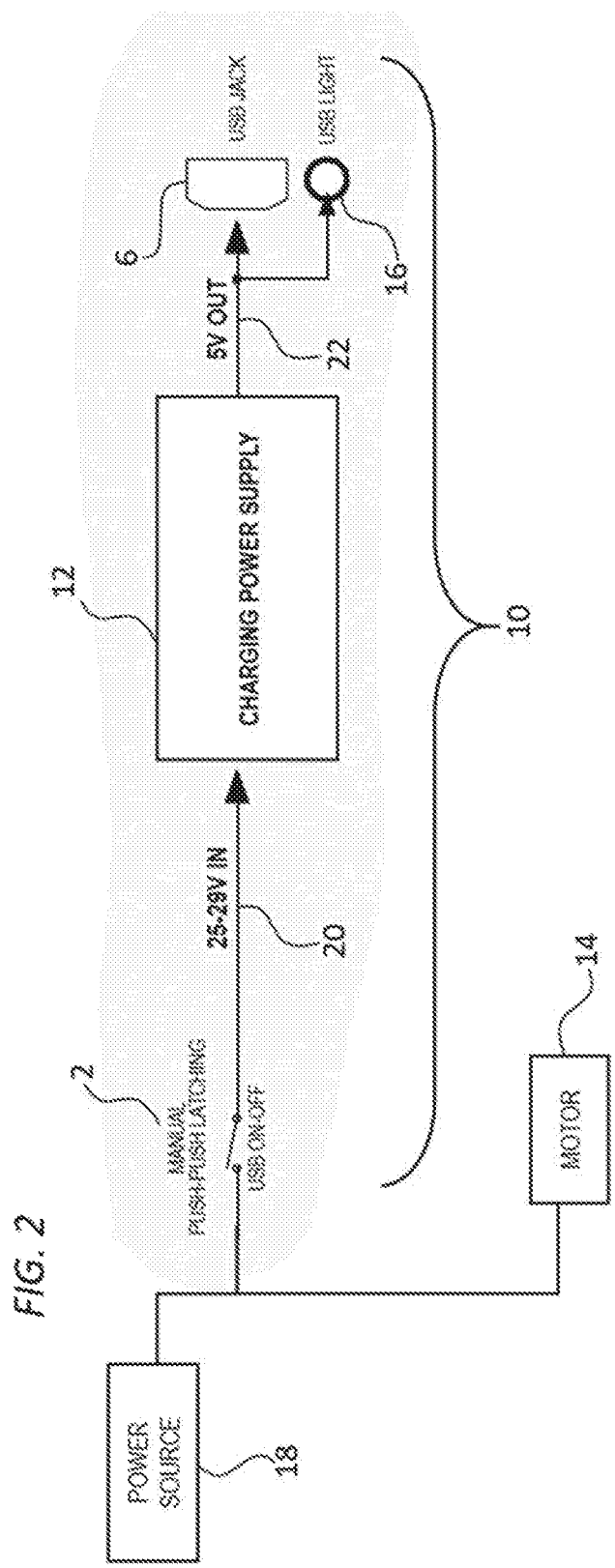
FIG. 2 is a diagram of an embodiment of the present invention comprising a charging module.

FIG. 1 shows an exemplary location for placement of a charging power switch 2 which is integrated into a control panel 4 that manages the power to a charging port 6 on a furniture 8 such as, but not limited to, a recliner. Power from a power source may be branched to the charging power supply 12 of the charging module 10 and to the motor for reclining as shown in FIG. 2. The charging power switch 2 may be used to cut-off the power to the charging power supply of the charging port, while not affecting the current to the motor 14 of the articulated components of the furniture such as a footrest, seat back, or lumbar support. In an alternate embodiment, the charging power switch 2 may be configured to reduce the output current such as by increasing the resistance in a converter that may be part of the charging power supply 12.

The control panel 4 may be located at any place on the furniture. The control panel 4 on a recliner may be located on the left side, the right side, or the dual side of the recliner or any at locations that are accessible to the user. In the alternate, the control panel may also be pendant/dangle connected to a cable or a wireless remote in which the furniture would require a wireless receiver. It is conceivable that the pendant or wireless remote may also be considered a first device that could be powered by the charging port.

Other powered furniture may include furniture having any other type of electrically powered devices or second devices comprising a device that may perform the actuation of boosting, lifting, rotating, extending, retracting, sliding, massaging or vibration. Another second device may include power being directed to a device that may be a heating seat feature, a cooling seat feature, a fanning and/or venting device, a refrigerator for food and beverages, and a heated and/or cooled cup holder. Another second device includes a decorative LED, a LED strip, any form of aesthetic lighting, a strobe light, a lighted cup holder, a decorative edge light, a mood light, a lamp, and a light indicator. The second device may also include a built-in video display, a camera, a tablet, a computing device, a microphone, a microphone receiver, a voice command system to control other devices and actuators on the furniture. Another second device may include a device capable of taking biomonitoring measurements such as, but not limited to blood pressure, heart rate, oxygen saturation, and body weight. The article of furniture may power a plurality of the aforementioned second devices and any other features or devices known in the art. The power may also be branched to a plurality of charging ports, each charging port having its own charging port switch or the entire plurality of ports being controlled by one master switch. Alternatively, the article of furniture may only have a charging module and no other electrical devices connected to the power source or the first device may also include a second device and vice versa so long as there is a selective power control for one device from the other device.

A camera may be any type of camera, and may include a covert security camera configured to be located at various locations on the furniture. In this preferred embodiment, the covert security camera may be located within the control panel and it may substitute as one of the covers of the buttons the control panel. The camera may be configured for capturing footage under lit and under darkened conditions. The camera may be equipped with infrared (IR) LEDs including micro IR. The camera may also be equipped with a motion activated sensor and transmit a notification to a user upon activation. Transmission of the notifications may also be limited to once or twice a day for the purposes of energy conservation and/or user's preference.

A voice command system may be used to allow a user to operate various features associated with the furniture by voice commands through a microphone. The microphone may be located at any location on the furniture. One preferred location of the microphone may be near the user's head such as within a headrest of a recliner. The voice command system may further comprise a microphone receiver, a CPU to interpret the commands and activate the various electronic features such as, but not limited to, the charging power switch, a motor's control, and access and operation of the internet and data access functions. The voice range of the microphone may extend to any range known in the art or to only 1-2 feet or less since the user's head may be in close proximity to the microphone. A voice command and/or button may be used to activate the microphone in order to activate various power management systems that control the charging port. Further to this embodiment, the system may include an audio speaker connected to the CPU such that CPU may provide the user with audible options of power management features and confirmatory audio signals to confirm receipt of commands or provide notification that the microphone is receiving. In such a system, the user may engage in a dialog with the CPU wherein the CPU provides a selection of command options and confirmations of actions and responses based on the user's commands. This voice command system may be used for other types of actions related to other devices of the furniture or to external devices or to the internet.

The furniture may also have a location where a first device may be placed and where the foam underneath the upholstery has resilient properties. The resilient location may become flattened by the pressure of the first device and restore its shape upon removal of the first device. The foam may comprise fully or partially viscoelastic foam such as memory foam. The foam may cover all or portions of the location. The foam may have perforations or channels to allow for dissipation of heat. Other materials such as liquid coolants or metals or alloys may be used as passive heat sinks. Mechanical devices such as fans may also be used in combination with these heat absorbing materials. The location for the first device may be configured near the charging port so that the first device may receive power from the charging port.

One exemplary type of charging port may be a universal serial bus or USB. A USB may exhibit a constant drain on the power with no first device connected to the charging port of the USB. In one example, a USB may continue to drain 5 mA or 120 mAh per day under a quiescent current where no first device is connected and current is permitted to flow to the charging port 6. Other USBs may exhibit greater loss with higher quiescent currents. In the present invention, the charging power switch 2 may be actuated to stop or reduce the current directed to the charging port 6 when the charging port 6 is not in use, thereby resulting in reduced wasted energy. A power indicator 16, such as a light, may also notify a user that the charging power switch 2 is in the ON or OFF or to a reduced current setting.

Further to the preferred embodiment in FIG. 2, the charging power switch 2 may be located between the power source 18 and the charging power supply 12, e.g., before the step-down conversion of voltage within the charging power supply's converter/regulator. The charging power supply 12 may be a DC/DC Buck Power Supply which may have, but not limited to, a 25-29V input 20 to a 5V at 2 A max output 22 via a step-down converter/regulator. Any other charging power supply known in the art may be used to provide power to a charging port and that the charging power supply is not limited to a particular output voltage, current, or direct current or alternating current. The charging power supply 12 may also vary the current such as through a variable resistor. Mechanisms of varying the resistance include, but are not limited to, a potentiometer or a rheostat. In the alternate, a charging power switch 2 may be used to reduce the current in order to conserve energy. The output 22 of the charging power supply 12 may be connected to both the charging port 6, such as a USB port, and the power indicator 16, such as a USB associated light where an LED is connected to the output 22 of the charging power supply 12.

The charging port 6 may be any type of port or socket. With regard to USB ports, the USB may include a dedicated charging port, a charging downstream port, or a standard downstream port, and with any version of USB connection such as 1.0, 2.0, 3.0, 3.1 micro-B, or C. Other charging ports may include, but are not limited to, inductive charging ports. Some forms of inductive charging may or may not conform to the Qi and/or PMA standards.

Induction charging may include a solid surface charging pad on the furniture. The charging pad may be located on the exterior surface or within a compartment. The dedicated charging pad may also be concealed within the upholstery so as not to distract from the look, feel, and/or use of the furniture. In one embodiment, the charging pad may position the inductive coil underneath the upholstery of the furniture. Further to this embodiment, the inductive coil may be located on or within a viscoelastic material. Placement of the charged device over this charging pad would also flatten the region which may provide better stability of the device as it rests over the inductive coil.

The power indicator 16 may comprise any form of visual alert display known in the art, e.g. an audio or verbal signal which may require a speaker, a vibrational alert which may comprise an eccentric rotating mass (ERM) motor or linear resonant actuators (LRA) motor, a phone call alert via a phone dialer, or any other signals known in the art to be sent from the furniture to a remote device either via a connected data port or a wireless alert mechanism that activates a notification system on the remote device. Notification to a remote device may comprise audio or visual components, or may be in the form of, but not limited to, SMS/MMS text messaging, an email, an audio message or any types of notifications/software running on a mobile device. Transmission of the notifications may also be limited to once or twice a day and at selected times for the purposes of energy conservation and/or user's preference.

The charging port may also have a built-in charging cord. The charging cord may be connected and used for any purposes with any type of USB port. The cord may be a retractable charging cord. The charging cord may also be fixed and/or non-flexible attachment that may be inserted into any first device. The charging cord may require any other physical supports to help position the first device while connected to the charging cord. The charging cord may be stored within a compartment or pocket in the furniture. In one preferred embodiment, the charging cord may be located in a discrete compartment that appears seamless from the overall design of the furniture. In an exemplary embodiment, a furniture with leather upholstery may have a charging cord compartment that is substantially flush with the overall furniture's periphery, and have a leather or any other material used on an outer cover of the compartment that matches the other exterior cover or covers of the furniture. The design may also make the compartment substantially hidden.

POWER MANAGEMENT SWITCHES. The charging power switch 2 may be any type of switch such as a push button switch, a push-button array, a push-push latching switch, a capacitor switch, a tact switch, a rocker switch, a toggle switch, a paddle switch, a slide and push switch, a DIP switch, a membrane switch which includes a push button, a pressure switch, a biased switch, a rotary switch, a reed switch, an illuminated switch, or a micro-switch that is responsive to movement. The switches may be of any sizes and may include mini switches, sub-miniature switches, and ultra-miniature micro tact switches. When multiple switches are employed, the switches may be placed at distances that are easily identifiable and discriminable from each other. The switches may have different shapes and sizes such that the switches may be identified by sight and/or feel. Size of the switches may differ in diameter by being ½" larger than the next-closet control switch. Switches may differ in materials, color, lighting, texture, location and/or any other physical property.

Figure 3:
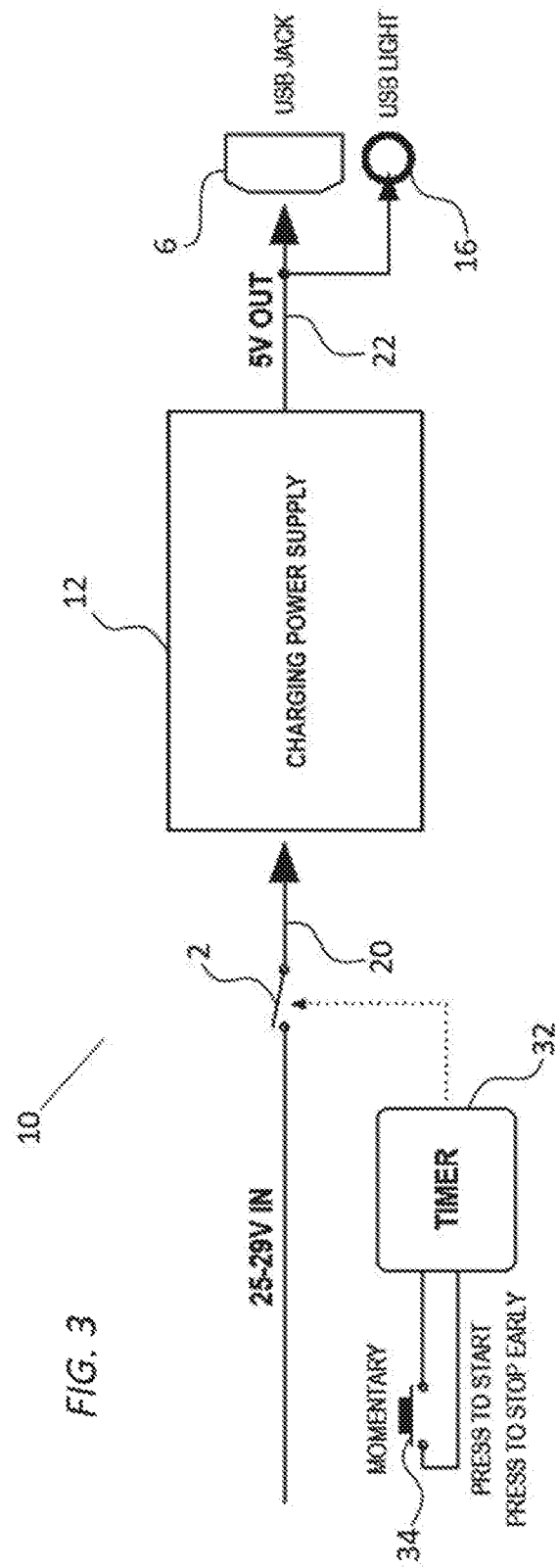
FIG. 3 is a diagram of a further embodiment of the charging module and a timer switch.

In a preferred embodiment as shown in FIG. 3, the charging power switch 2 may also include the use of a timer switch 32. Examples of timer switches may include, but are not limited to, switches that are mechanical, electromechanical, or electronic with semiconductor timing circuitry. One possible embodiment of a timer switch may employ a momentary switch 34. Manually pressing the momentary switch 34 allows the current to proceed for a predetermined time interval. At the end of the time interval, the momentary switch 34 would switch to the OFF position or a reduced current setting. The momentary switch 34 may also have an "early stop" function where the user may press the switch again and cut-off the power or reduce the current before the time interval ends. An "early stop" may also reset the timer. In the alternate, the switch may pause the time interval of the timer which may be resumed by pressing the momentary switch 34 again. The momentary switch 34 may also have additional settings or the control module may have one or more additional switches that may function to reset the timer, extend the timer duration, or pause the timer.

A predetermined time interval may be of any duration. The duration may be selected based on the time required to charge, partially or fully, a particular first device such as a mobile phone or tablet. A possible predetermined time interval may be 4 hours. The time interval may also be manually or automatically selected. A timer may range from a spring wound timer to a universal timer delay circuit module or any timer known in the art. A universal timer delay circuit may be capable of delaying or disconnecting power for a predetermined time as well as allow for enabling power reoccurring power cycles. The time interval may be selected through a charge time module that gauges a first device's charge capacity and/or state of charge (SoC) of the first device along with the charging port's current in order to estimate the charge time of the first device's battery.

Figure 4:
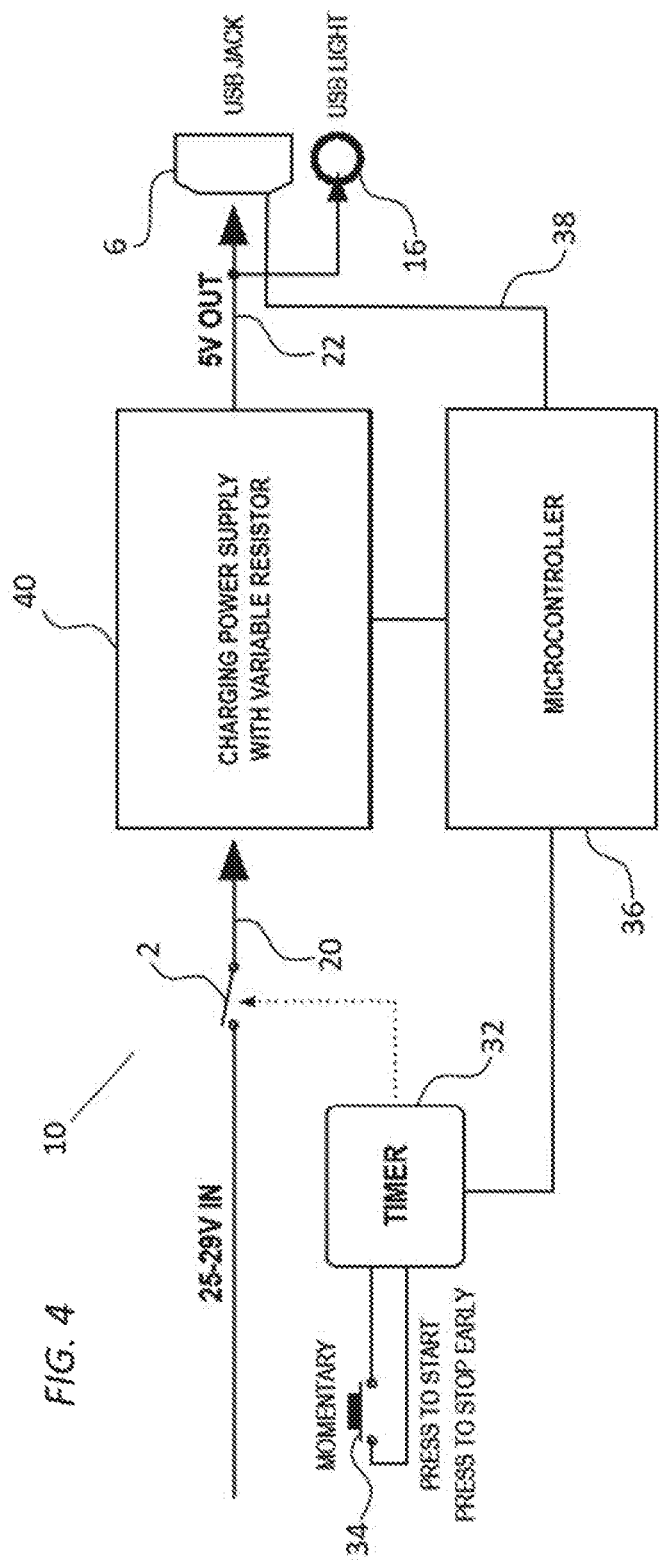
FIG. 4 is a diagram of a further embodiment of the charging module having a microcontroller and variable resistor.

As shown in FIG. 4, the current of the charging port 6 may also be modified by a variable resistor, such as a digital potentiometer, and selection of the current may be selected based on the type of charging needed for the first device so that the charge time may by adjusted and programmed into the timer. The user may increase the current to the charging port 6 to shorten the charge time, or the user may reduce the current to the charging port 6 for longer charge times. A shorten charge time may be elected based on the user's restricted time. A longer charge time may be preferred to safeguard against any damage to a first device caused by rapid charging. It should be understood that a particular charge time may be selected for any reason. Measurements of the first device's charge capacity or SoC or data transfers via data line(s) 38 that contain such charge capacity information that may be uploaded from the first device, calculations of charge time, and changes made to the charging port's current which result in changes to the charge time of a timer switch may be initiated by a microcontroller 36 having a processor and stored memory capacity.

Further to this embodiment, a microcontroller 36 may be integrated into the charging power supply with a variable resistor 40. The microcontroller 36 may also adjust resistance in the charging power supply with a variable resistor 40, and thus the current to the charging port 6. The microcontroller 36 may also adjust the predetermined time interval in the timer switch 32 in order to change the charge time. Safety cut-offs may be programmed into the microcontroller 36 in order to avoid hazardous charging conditions. For example, the microcontroller 36 may monitor temperature through thermocouples or other temperature sensors on the power source, charging power source, or any other component on the furniture that may require safe or efficient operating temperatures as well as on the first device such as uploading temperature states from the first device such as through data line(s) 38 to the charging port 6. The microcontroller 36 may adjust the output 22 current based on these measured temperatures or may have programmed threshold limits on the current to avoid such conditions as overheating of the power supply and the first device.

Figure 5:
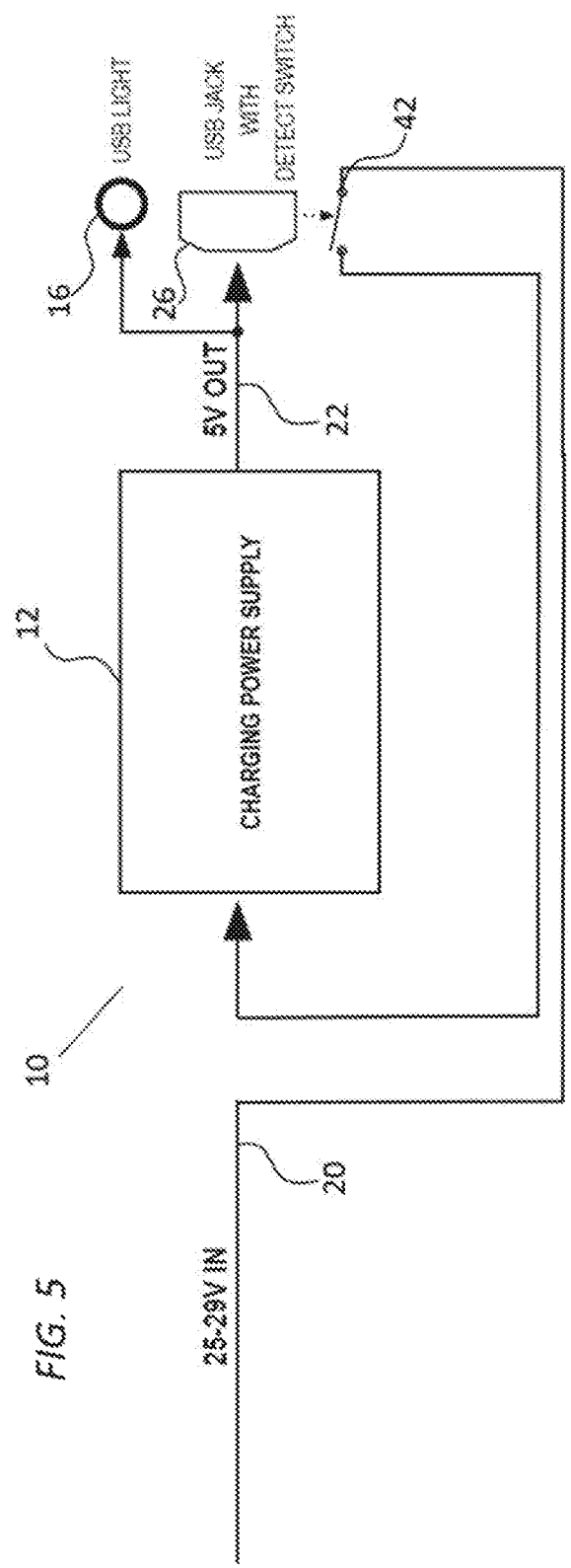
FIG. 5 is a diagram of a further embodiment of the charging module having a detect switch.

In another exemplary embodiment, a charging port may have a detect switch 42 which detects the presence of a charging cable plugged into the charging port 6, as shown in FIG. 5. One example of a detect switch 42 may be a sense contact switch, located within a USB port 26. The sense contact switch is activated upon insertion of a USB cable. One example of a USB port with a sense contact is manufactured by AMPHENOL ICC (FCI), brand part no. 73725-0010BLF. In this example, the sense contact switch mechanically senses the USB cable by deflecting the sense contact switch such that the switch's conductor contacts the ground. When the charging cable is removed, the conductor is released as the sense contact is no longer deflected. A photo sensor or any other sensor switch known in the art may be used to detect the insertion of a cable or connection of a device.

Figure 6:
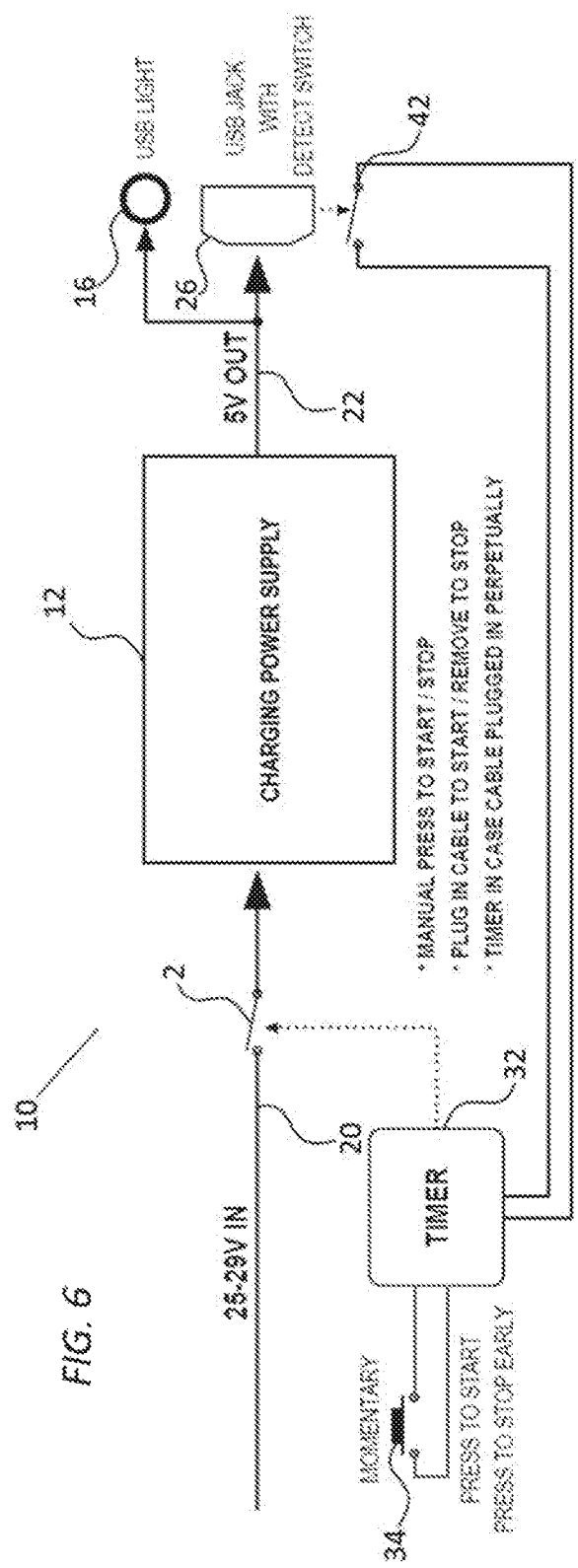
FIG. 6 is a diagram of a further embodiment of the charging module having a combination of a timer switch, an early stop switch, and a detect switch.

In another embodiment, the detect switch 42 may be used in combination with a timer switch 32. See FIG. 6. The timer switch 32 may be used to stop or reduce unnecessary power consumption that may occur when a charging cable that is left in the charging port without any first device and would otherwise continuously drain power by keeping the charging power switch 2 ON. The timer switch 32 limits continuous activation of the detect switch 42 upon the expiration of the charging time interval. At the end the time interval, the timer switch 32 will automatically set the charging power switch 2 to OFF or lower the current. The timer switch 32 would override any activation caused by the detect switch 42. Further to this embodiment, the timer switch 32 may be jointly controlled by a momentary switch 34. The momentary switch 34 may have at least two actuation controls; the first being the activation of the timer, and the second being an "early stop" function. The momentary switch 34 may also override the detect switch 42. The momentary switch 34 may also reset the timer switch 32 such that the detect switch 42 may reactivate the timer switch 32.

In an alternate embodiment, the sense contact may be at the distal end of a charging cable. One example is a deflect conductor configured on the exterior of the distal plug-in end of a lightening or micro USB cable. When the distal end is plugged in, the deflect conductor, which protruding at angle from the planar surface of the end, becomes depressed as it is inserted into the first devices' compatible port. The depression of the deflect conductor allows the conductor to contact the ground thereby activating the charging directly or activating a timer switch to provide power the charging port for a predetermined time. Dedicated insulated wiring throughout the cable may be required to make connection with charging module components and other switches. In the case where a timer switch is activated, the removal of the first device before the end of the charging time interval causes the release of the sense contact which cancels the timer. Further to this embodiment, the charging cable may have multiple plug-in connectors including universal connector ends such that the charging cable fits various first devices. One end may be a dual combined lighting connector and micro USB connector. The charging cable may be detachable or fixed to the charging port or replace the charging port altogether.

Figure 7:
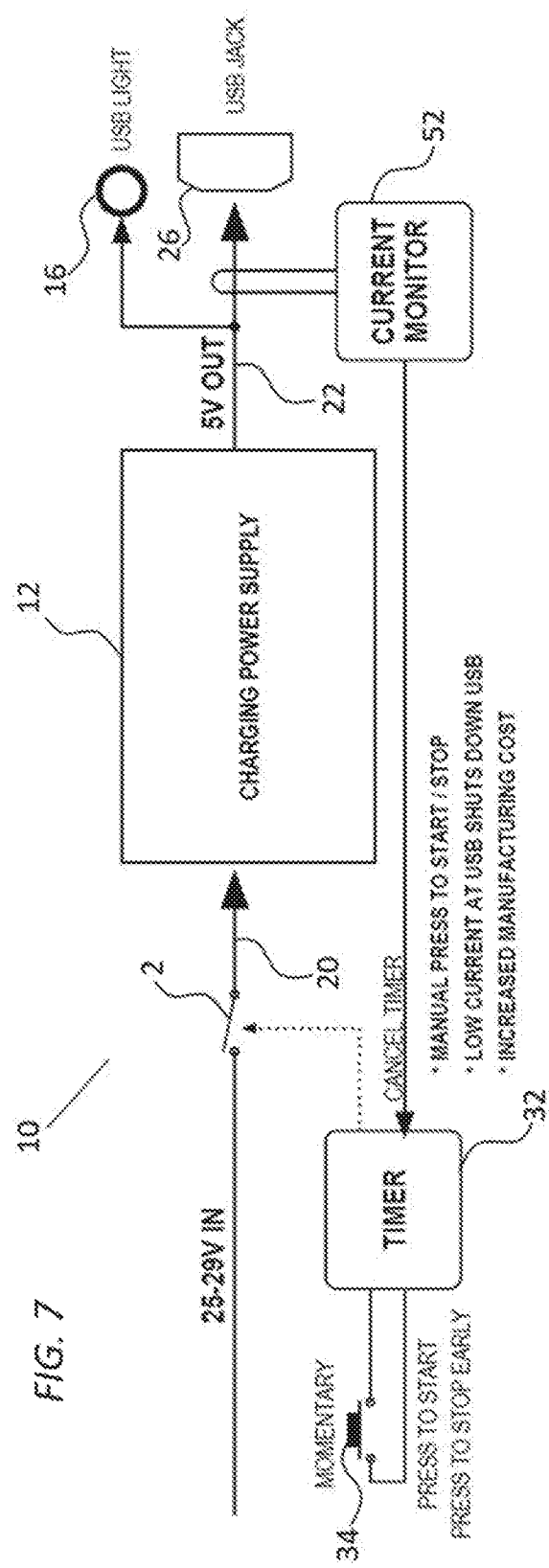
FIG. 7 is a diagram of a further embodiment of charging module having a current monitor with a cancel timer switch, a timer switch, an early stop switch, and a detect switch.

An alternate power management system may have a current monitor 52 that controls the charging power switch 2 if the output current falls below or rises higher than a threshold current range as shown in FIG. 7. In one example, the current does not reach a sufficiently high current, the current monitor 52 may signal the charging power switch 2 to be set at the OFF position. In an alternate embodiment, the current monitor 52 may cause the charging power module to reduce the output current. Examples of a current monitor may range from the use of a coiled wire wrapped around a reed switch to a current monitoring integrated circuit (IC) capable of sampling voltage at two or more locations between the charging power supply and the charging port. The current monitor 52 may be used in conjunction with a timer switch 32 where the current monitor 52 may cancel the charging interval should the current be lower. Lower currents may arise when the first device has almost reached full charge and the first device adjust its own charge settings is set to a trickle charge. In an alternate embodiment, the furniture may have its own system to detect the charge capacity of the first device and set the current to a trickle charge setting. The current monitor 52 or an additional current monitor may also detect high current levels that may damage the first device. The use of current monitor system may also be employed in combination with any of the aforementioned detect switches which also may be used in combination with a timer switch 32 and a momentary switch 34.

Figure 8:
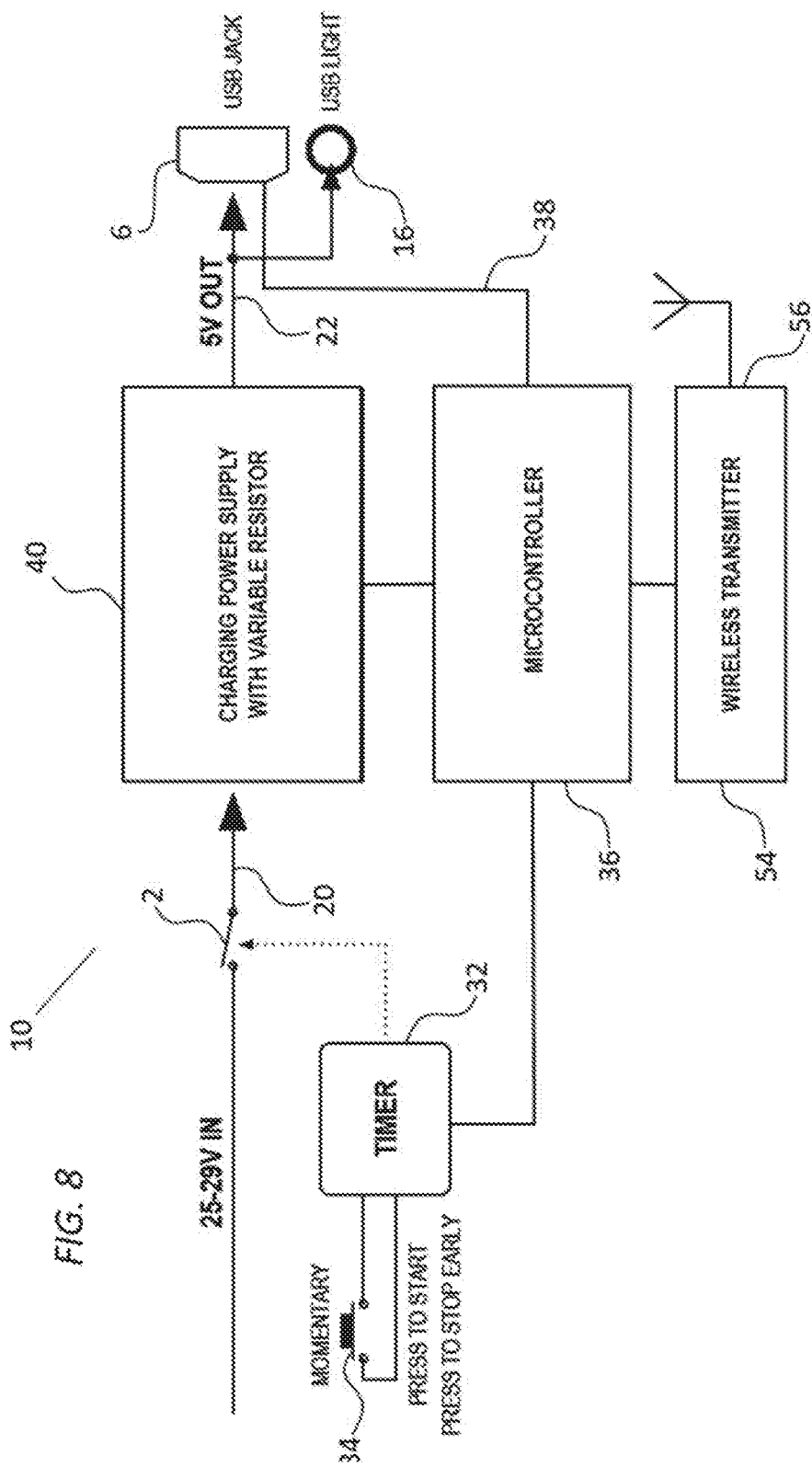
FIG. 8 is a diagram of a further embodiment of a charging module having a switch, a variable resistor, a microcontroller, a data line, and wireless transmitter.

FIRST DEVICE COMMUNICATION. The charging module 10 may provide notifications to a remote device either through direct connection to the charging module through a data line such as data line 38 connected to data port wherein the data port that may be integrated with a charging port 6. An example of an integrated data and charging port may include a USB port. In an alternate embodiment, the notifications may be sent through wireless communication ports which may be connected to a microcontroller 36. See FIG. 8. Wireless communications may be through any type of wireless data module such as a Bluetooth interface, a Wi-Fi interface, an infrared data port, or any other interface known in the art. Transmission of the notifications may also be limited to once or twice a day for the purposes of energy conservation and/or user's preference.

The microcontroller 36 may provide notifications to a user's remote device. The notifications may be sent through a wireless transmitter 56 and received by the remote device's wireless receiver. The content of the notifications may provide the status of the various components of the charging module such as whether a charging power switch 2 is ON or OFF or in a reduced current setting, a duration or remaining time of a timer switch 32, and/or charging time of a charging connected device or the charge capacity or SoC of the charging first device's battery. In an alternate embodiment, the wireless transmitter 56 may transmit the current levels monitored by a current monitor at the charging port 6, and/or notify the user of any automated actions performed by the charging module, such as activating the power switch in response to a low current level reading or setting charging time on a timer switch in response to a first device's battery capacity and the charging port's current.

Figure 9:
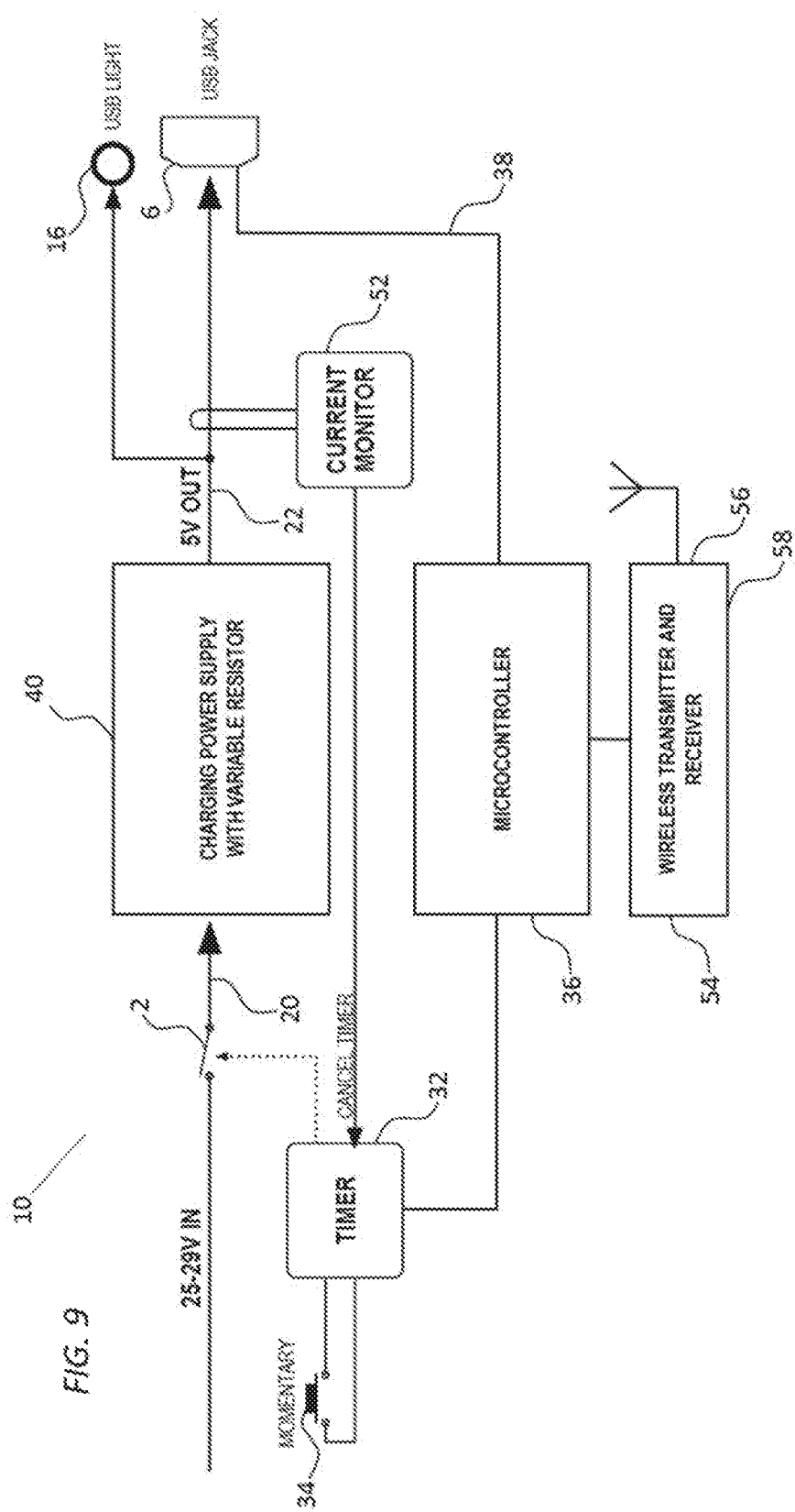
FIG. 9 is a diagram of a further embodiment of a charging module having a switch, a variable resistor, a variable resistor, a current monitor, a microcontroller, a data line, a wireless receiver, and a wireless transmitter.

In one preferred embodiment, a power management switch comprising a current monitor 52 may activate the wireless transmitter 56 to send a signal upon detection of a low current to a user's wireless remote device, such as, but not limited to, a mobile phone, a tablet, or a computer. See FIG. 9. In response to the signal, the user may activate the charging power switch 2 either directly or remotely through a wireless activation command. Further to this preferred embodiment, the charging module 10 may comprise a wireless receiver 58 which receives the user's wireless activation command and executes such functions through the microcontroller 36.

The microcontroller 36 may receive commands to activate any components of the charging module 10. Commands may comprise of activating a timer switch 32, setting a time switch interval, activating an "early stop" of a timer switch 32, inquiring the charging module 10 to provide status information of charging and/or information about an electrically connected first device, altering a charge time of a first device by changing the current to the charging port 6. The microcontroller 36 may also activate the reduction of the current output. In response to a user's commands, confirmatory notifications may be sent back to the user's remote device(s)s.

Figure 10:
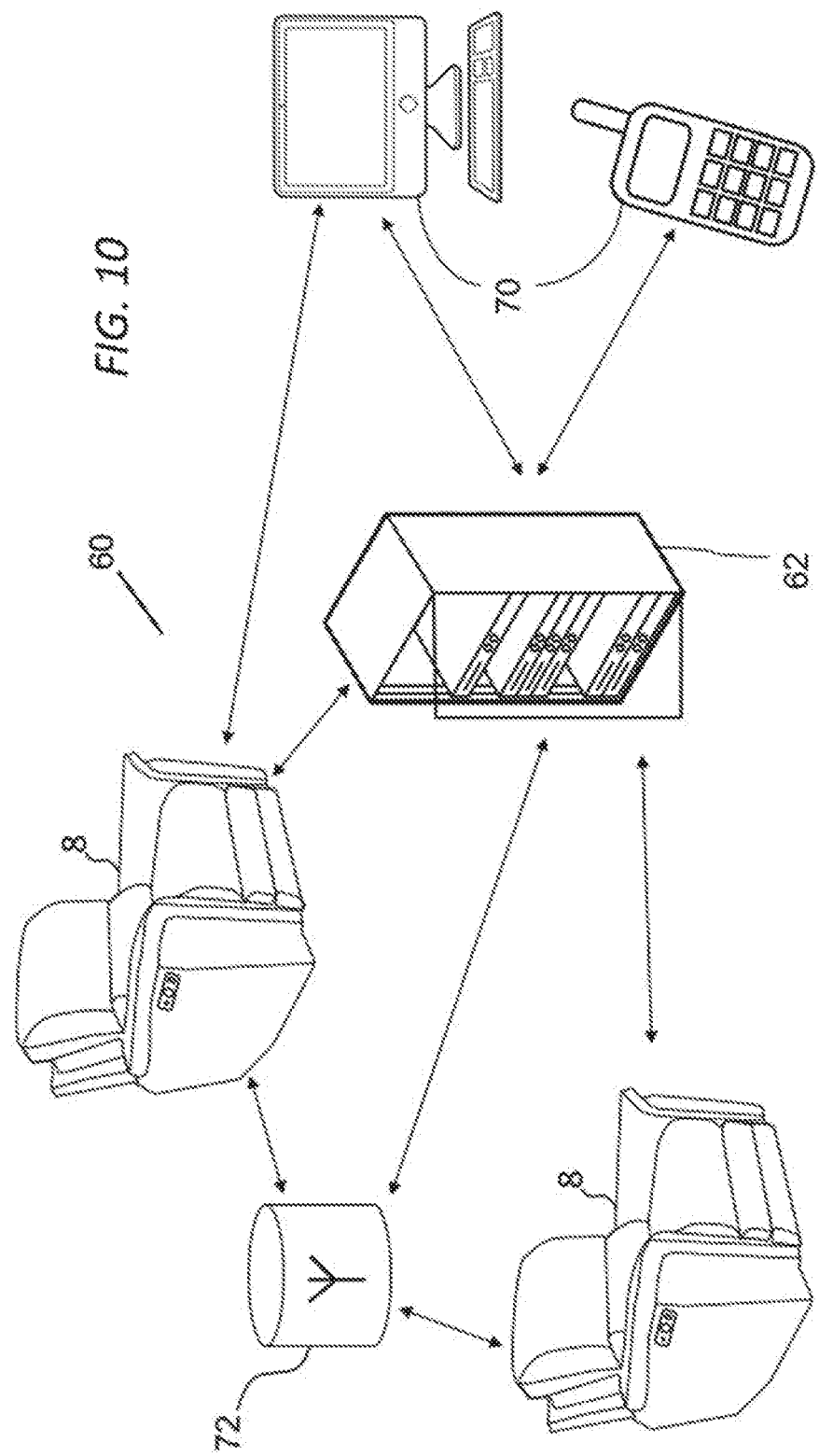
FIG. 10 is a diagram of an embodiment of the present invention comprising a status update system network.

STATUS UPDATE SYSTEM. The charging module of a furniture 8 may be used in a status update system 60. See FIG. 10. Generally, a status update system 60 generates data representing diagnostic or status information about a module or modules and either stores the data locally on a microcontroller(s) or transmits the data to a content server 62. Diagnostic and status information include, but are not limited to the level of current at one or more charging ports, whether a cable is inserted into the charging port, whether a first device is inserted into a charging cable, or error data (e.g., troubleshooting information of various components of a charging module). One or more charging modules may transmit additional data to assist in routing and transmitting the diagnostic or status data, including, but not limited to metadata, data specific to underlying transmission protocols, identifying information for when there are multiple charging module units in any number of furniture (e.g. a unique identifier for determining which charging unit any transmitted diagnostic or status information pertains to), or other similar data.

In a preferred embodiment, the charging module may include a microcontroller or an on board diagnostic module perform a serial scan chain. A microcontroller of a charging module may be programmed to run a diagnostic program which may detect various states of the charging module such as connections to the charging port or current between the charging power supply to the charging port. The microcontroller may generally have any diagnostic data generation modules known to those in the art, such as, but not limited to, current monitoring detection methods. Status data generation modules may include, but are not limited to programs or hardware which detect the state of the charging module. Status data generation modules may utilize resources from one or more diagnostic data generation modules or use separate hardware or logic to generate status information. In one embodiment, the status data generation module may be where a microcontroller of a charging module acquires data from memory after it is stored by a serial scan chain method. In another embodiment, the status data generation module may be where a microcontroller employs further logic to store data representing state changes of the charging module. The charging module may use existing resources of the charging module or use separate hardware and/or logic to generate data such as current and power consumption data. In one embodiment, a microcontroller may have further logic to program a unique identifier and/or other locator or identification data into memory for each charging module or furniture.

The status update system 60 may have an information retrieval method to retrieve from the charging module representing status or diagnostic information. The information retrieval method may be manual or automatic.

Manual information retrieval methods may encompass manually downloading data directly from the charging module via a separate device. The first device 70 may be any electronic device capable of storing binary data (e.g. a CPU or solid-state flash drive or mobile phone running an application). Manual information retrieval methods may encompass downloading wirelessly or through a wired connection. Either one or both of the charging module's microcontroller and the first device's IC may run computer programs to coordinate downloading data from the charging module. The USB data port may be combined with the charging module of furniture 8 where the serial bus may include the required data lines. In an alternate embodiment, the data lines may also be combined into two power bus lines wherein the power bus lines pass both data and power.

Automatic information retrieval methods may include computer initiated transmissions to a content server 62. In a preferred embodiment, the charging module may be connected to a network interface 72 which communicates diagnostic or status information to a content server 62. Network interface 72 may include one or more networks, including but not limited to, a local area network, medium-area network, and/or wide-area network, such as the Internet. Network interface 72, for example, may be any form of wired or wireless network that allows the charging module and content server to communicate with each other. In one embodiment, network interface may be a main frame. In another embodiment, network interface may be a Bluetooth based personal area network (PAN). Regardless of the type of network interface, the charging module may have a corresponding network interface microcontroller which operates with a computer processor unit (CPU) to transmit data representing diagnostic or status information to a content server through network interface. The content server 62 may include any form of data including, but not limited to, status data of the charging module and charging time calculating algorithms. Content server may also include audio, video, text and any other form of data. In one embodiment, content server may be a database or repository implemented on a server (or computing device). Such a content server may be a workstation, mobile device, computer, cluster of computers, set-top box, or other device having at least one processor. Such a processing device may include software, firmware, hardware, or a combination thereof. Software may include one or more applications and an operating system. Hardware can include, but is not limited to, a processor, memory and graphical user interface display.

In a preferred embodiment, one or more clients may communicate with content server 62. For example, first device 70 may retrieve content from content server 62 via a network interface and display the retrieved content using a display. In an exemplary embodiment, status update system may have a mobile device which provides Hyper Text Markup Language (HTTP) requests for charge time data from the content server and receives HTTP responses that include charge time data. Such an application may be useful to allow the user to monitor energy consumption, receive energy savings, receive notifications of automated actions, or information about setting time intervals for charging. In the alternate, where charging time is automatically set, the display may provide status of the power switch or remaining time required for charging. The first device 70 may also relay activation commands such as setting the timer intervals for charging or shutting off charging to the content server 62 which in turn relays such commands to the charging modules. It should be appreciated that the network interface, network layers, client device or display, nor data structures are not limiting factors of the exemplary embodiment. For instance, in another example, a status update system 60 may have a client running a virtual connection to a content server to retrieve data representing diagnostic information transmitted by one or more indicator units.

Figure 11:
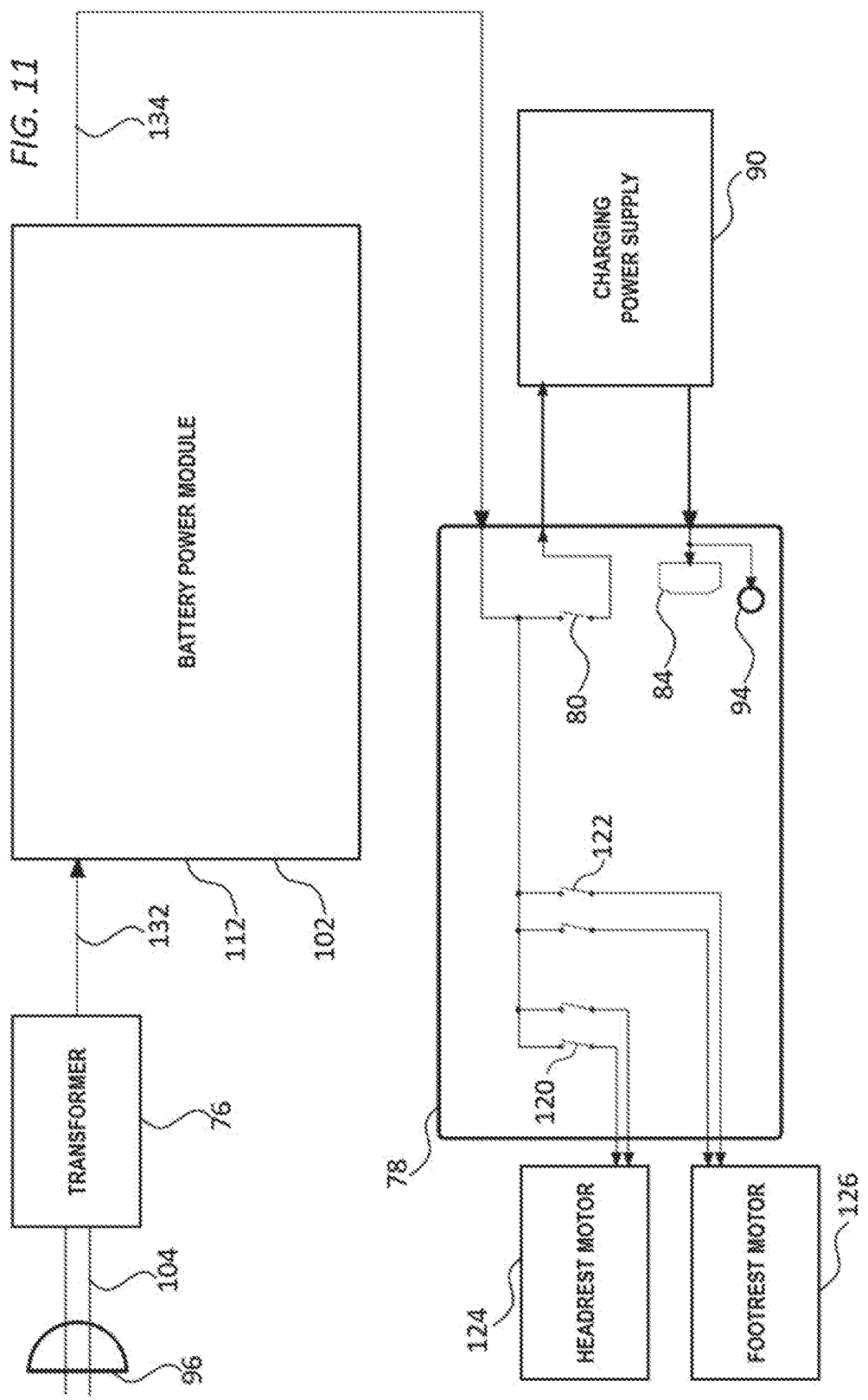
FIG. 11 is a diagram of an embodiment of the present invention comprising electrical components of a motorized articulated furniture having a battery power module and a charging module.

BATTERY POWERED CHARGING MODULES. In FIG. 11, the furniture may also have a furniture battery 102 to provide power to the charging port 84. The furniture battery 102 may be a rechargeable battery and in some embodiments, may be charged from a fixed power source 96 such as a wall outlet. A power cord 104 may be used to connect the power source such as a wall outlet to the furniture, and provide power to both the furniture's devices and recharge the furniture battery 102. When the power cord 104 is not in use, the power cord 104 may be removed or retracted so as not substantially extend from the furniture. The power cord 104 may be retracted or stored in a compartment of the furniture. In this preferred embodiment, the power cord 104 removal and/or retraction allows the furniture to be placed in practically any location in a room without having any power cord or charging cable extending from the furniture.

In a preferred embodiment, the furniture battery 102 may be the power source and supply power to charging module as well as other electrical devices on the furniture. To conserve the life of the furniture battery 102, the charging power switch 80 may be placed in the OFF position to reduce energy consumption at the charging port while supplying power to other internal or external electrical devices such as one or more headrest motor(s) 124 or footrest motor(s) 126, all controlled by their own headrest switch(es) 120 or footrest switch(es) 122. In an alternate embodiment, the power switch may reduce the charging power supply's output current. The charging power switch 80 or switches may also be used to switch off the power to all or some of the other electrical devices. In one preferred embodiment, a motorized reclining chair having a USB port as a charging port 84 and a furniture battery 102 of 1800 mA would consume at least 5 mA if the power switch was not set to the off position. At a 5 mA rate of consumption, the rechargeable battery would be drained in about 15 days. Daily continuous quiescent power consumption by the charging power supply 90 would consume enough energy to support 8 to 20 cycles of recliner operation. The estimated loss of cycles may depend on the user's weight and nature of operation. Employing a charging power switch would increase the longevity of the stored energy in the furniture battery 102 and may provide enough energy for more than 300 cycles of the recliner. The exact number of cycles of use depends on how often the user turns the power switch 80 off when not using the USB port, the number of times the USB port is in fact used, and user's nature of operation of the motorized recliner functions. The quiescent USB current may also vary based on the different materials used in the circuitry of the charging power supply 90.

A user may also be notified that the furniture's battery 102 has reached a low voltage threshold. The user may then activate the power switch 80 to help conserve the furniture battery's power. The notifications may be received in any number of ways such as, but not limited to, an audible alert or a wireless transmission on a user's remote device. In a wireless system, the user may activate the charging power switch remotely through a user's wireless first device.

The charging module may receive power directly from a fixed power source 96 such as a wall outlet. The power source may also originate from the furniture battery 102. The furniture battery 102, which may be non-rechargeable or rechargeable, may comprise any type of chemical composition such as but not limited to alkaline or Li-ion or any other battery known in the art. The furniture battery may be single cell or multiple cell battery in any known circuit arrangement. The battery may have also employ any known protective and energy conserving circuit hardware and software. Multiple power sources may also simultaneously provide power to a charging module, such as, but not limited to, both a wall outlet and a furniture battery and/or from multiple battery sources. Power generators, such as dynamos and alternators, may also provide power and may be integrated into the various components of the furniture. For example, furniture motors may provide the mechanical energy to generate electrical power which may be used to power other connected electrical devices or recharge a battery.

In one preferred embodiment, the furniture battery 102 may be a battery power module 112 such as the AKKU-PACK from Limoss, US. See FIG. 12. Power is supplied from a power source 96, such as a wall outlet, to a transformer 76, which is then passed to the input 132 of the battery power module output 134. This AKKU-PACKs transformer delivers about 24-32V DC to the battery power module 112. If the power from the transformer 76 is lost, the battery power module output 134 transitions from delivering power from the battery instead. If power from the transformer 76 is restored, the battery power module 112 transitions back to delivering transformer power to the output as well as providing power to the battery.

Further to this embodiment, the battery power module 112 may contain seven cylindrical lithium ion cells 106 stacked in series which in this configuration, may deliver about 25V under load and an open circuit voltage of around 28V when fully charged. In the case of using batteries that contain chemicals like lithium ion, the batteries may require additional care and control. A protection circuit 110 may be required to protect the cells from damaging caused by over discharge, excess current, or excess temperature. The battery power module 112 may also include a monitor circuit 114 that activates a signal when the battery must be recharged. The signal may sound an alarm such as a piezo alarm. The battery power module 112 may also have an LED which serves as a battery status indicator 116 that displays one type of color during charging and another type of color when the charging is complete.

A protection circuit 110 may switch off the output through a protective switch 118 upon detection of over-currents and of potential complete discharging of the battery. For some types of batteries, a complete discharge may result in permanent battery damage. The protective circuit 110 may have leads 119 that monitor the terminal voltage of each battery. The protective circuit 110 may be programmed to switch off the batteries' output upon a detected low voltage fault condition.

Figure 12:
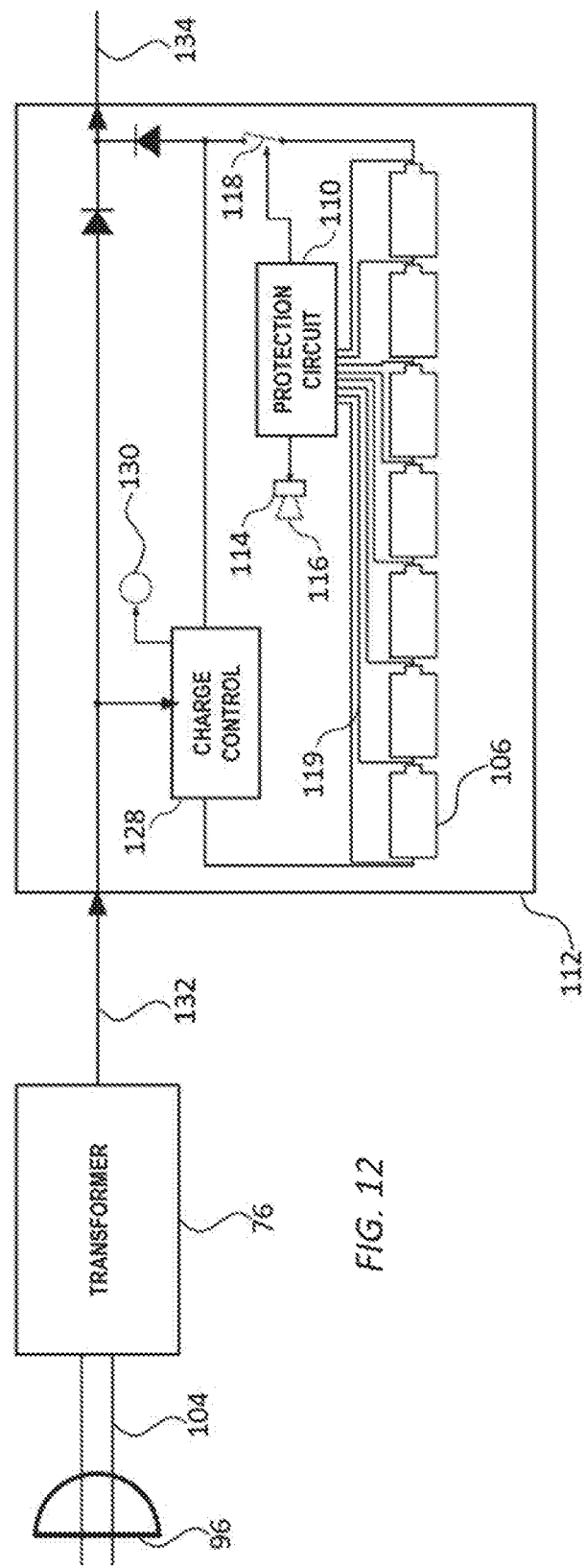
FIG. 12 is a diagram of an embodiment of a battery power module.

In FIGS. 11 & 12, the battery power module's output 134 may then be directly connected to a charging power switch 80 which in turn controls the power to the charging power supply 90 and subsequently the charging port 84. When the charging power switch 80 is turned ON, power will be discharged to the charging port 84 and power will be lost regardless of whether the charging port 84 is connected to the device or not. When the charging power switch 80 is turned OFF or set to a lower current setting, power loss to the charging port 84 is limited thereby conserving the battery storage. In an alternate embodiment, the battery power module may also have its own charging power switch through an integrated circuit such as the protective circuit or a combined control of such a protective circuit and the charging power switch 84. If a protection circuit is used, the protective circuit may switch off the charging power switch 84 upon a particular low voltage fault condition. With respect to motorized actuated furniture, a hierarchy of the electrical devices receiving power may be established in the protective circuit. For example, a threshold cut-off power to a USB port may be at a higher battery voltage than the threshold voltage of the protective circuit. A separate microcontroller or any other conceivable circuit configuration may also be used to monitor battery voltage levels and control switches to the charging port and other devices based on predetermined hierarchies or user preference settings. In one preferred embodiment, the hierarchy may provide sufficient battery power to keep primary electrical devices on the furniture such as the motor for a footrest or seat back operational for any desired number of cycles while shutting off power to the charging power switch.

Figure 13:
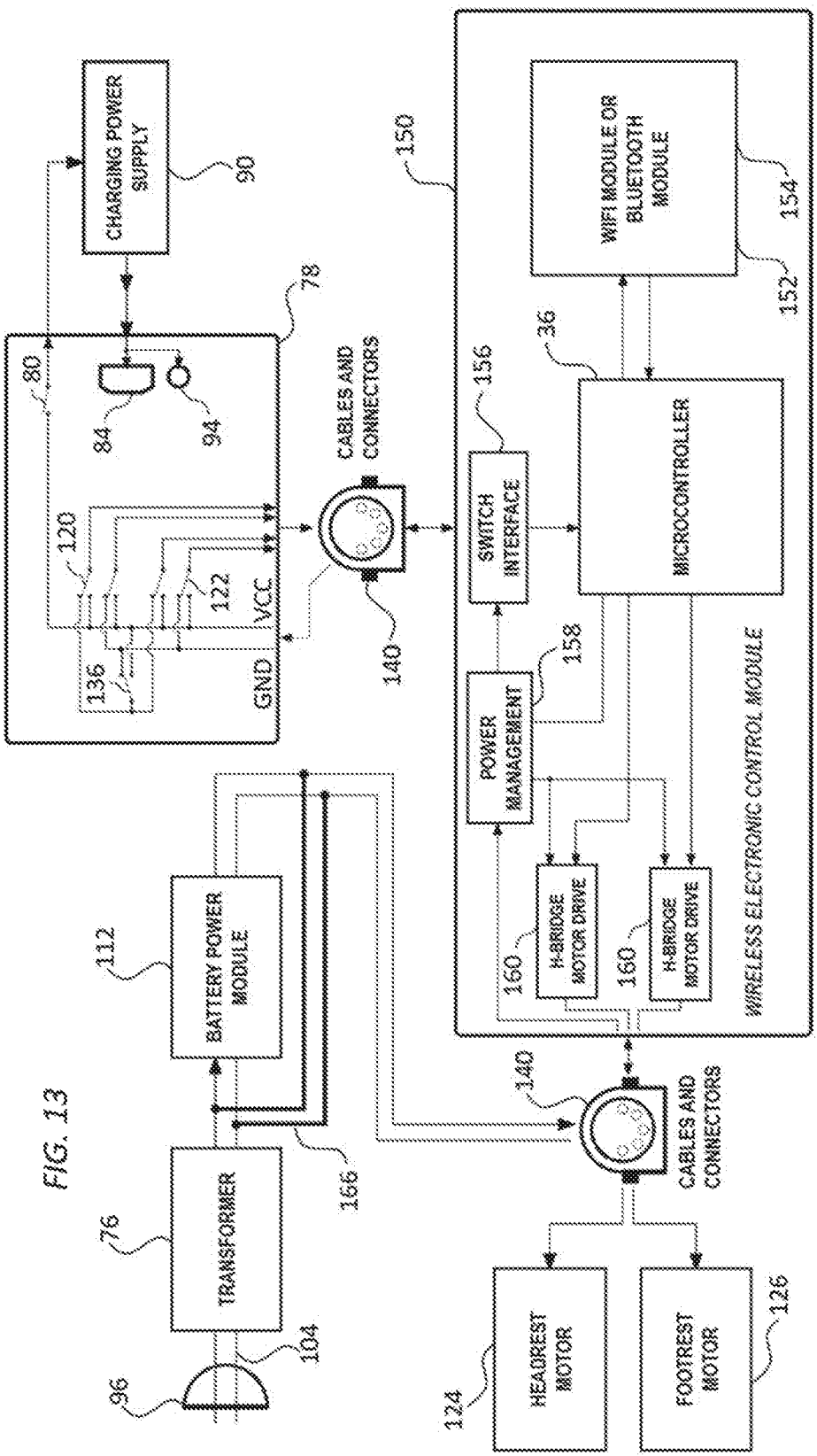
FIG. 13 is a diagram of an embodiment of the present invention comprising electrical components of a motorized articulated furniture having a battery power module, a microcontroller, a control module, and a wireless module.

In the preferred embodiment of FIG. 13 for a recliner, the charging module may be a wireless charging module 150 with a microcontroller 36 that controls various switches through the switch interface 156. The switch interface 156 may control the charging power switch 80 along with the headrest switch 120, the footrest switch 122, the home switch 136, i.e. the switch that returns the recliner in its upright position, through a hub that holds the cables and connectors 140. The microcontroller may control the power management module 158 as well as drives 160 such that sufficient voltage is supplied to the motors 124 126. The microcontroller 36 also controls and receives signals from the wireless module that has a WiFi module 152 and/or Bluetooth module 154 where the microcontroller 36 may receive commands through an remote wireless device to activate various switches and modules and the microcontroller 36 may send notifications to the remote wireless device to confirm actions or provide status updates.

Further to this embodiment, alternate connections 166 from the transformer 76 to the power management module 158 may be used when the battery has reached a low voltage state. A switch may also be included to prevent the use of the wireless module when no power is supplied from the alternate connections.

In another prefer embodiment having a battery, the charging module's power switch may be any of the various power management switches or combination of switches described above. See FIG. 14. The charging module's power switch may include a timer switch activated within the microcontroller 36 and a cancel timer switch where that may be controlled by a current monitor 52. The status may be sent from the microcontroller to notification systems such as through the wireless module which may send notifications to a user's remote device. The user may then send commands to the microcontroller to turn off the power to the charging power switch or alter the current and/or charge times. The user may also be notified of a lower battery condition or access the furniture battery's remaining stored energy and/or the estimated number of cycles or period of use of the furniture's other electrical devices. The user may then elect to cut-off the power to the charging module in order to converse the furniture battery's storage or recharge the furniture's battery. A low battery alarm may also initiate an automatic cut-off or reduction of power to the charging power supply or port.

Figure 14:
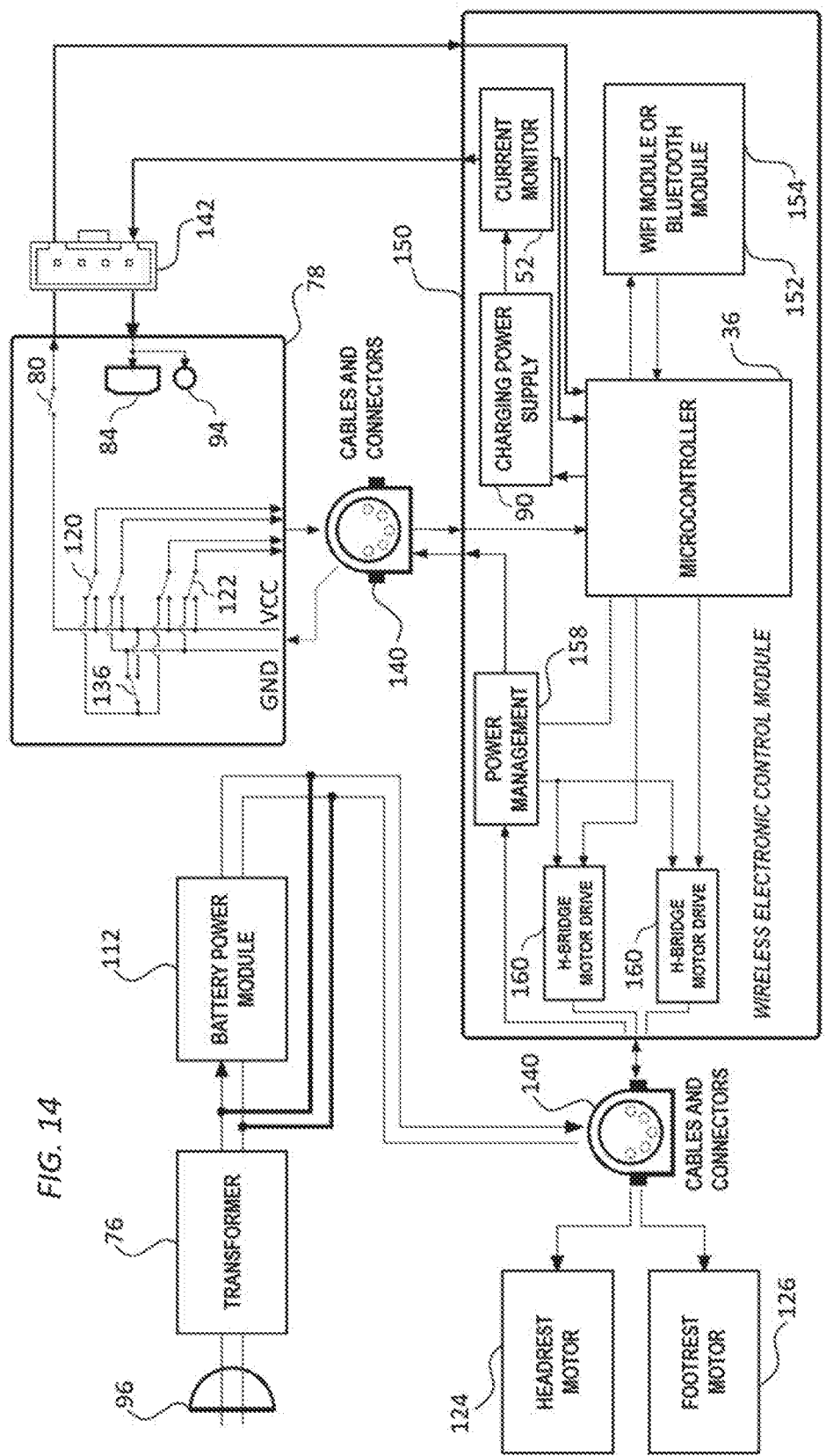
FIG. 14 is a diagram of an embodiment of the present invention comprising electrical components of a motorized articulated furniture having a battery power module, a microcontroller, a control module, a current monitoring module, and a wireless module.

Further to the preferred embodiment in FIG. 14, the current to the charging port may supplied through the current monitor 52 which receives the current from charging power supply 90 directly. The charging power supply 90 may receive its power from the microcontroller 36 since the voltage requirements may be sufficiently lower than other electrical devices such as the motors 124 126. The wire that controls the charging power switch and the wire that supplies power from the current monitor 52 to the charging port 84 may be secured to the furniture by a wire harness 142 as the wires would likely extend to the control module 78 where the actuators, LED lights, and charging power would be located on the furniture.

The invention disclosed herein is not limited to the specific embodiments described herein. The disclosed embodiments may be modified or have elements deleted or added while still remaining within the scope of this invention. While the specification describes particular embodiments of the present invention, those of ordinary skill can devise variations of the present invention without departing from the inventive concept.

We claim:

1. An article of furniture comprising:
   a. a power source;
   b. a charging port electrically connected to the power source that is capable of connecting to a first device and capable of providing power to the first device;
   c. a first switch located in the electrical connection between the power source and the charging port, wherein the first switch is configured to be actuated to prohibit quiescent loss when the charging port is not in use;

d. a motor connected to at least one portion of the article of furniture and configured to actuate the at least one portion of the article of furniture;

e. the motor being electrically connected to the power source, a second switch controlling the power from the power source to the motor, and the second switch not limiting the power to the charging port, f. the first switch configured to limit the power to only the charging port, while not limiting the power to the motor; and g. a charging power supply electrically connected to the power source and to the charging port wherein said charging power supply is a DC-DC converter that converts a first DC voltage inputted from the power source to a second DC voltage outputted to the charging port wherein said first switch limits the power from the power source to the charging power supply.

2. The article of furniture of claim 1 further comprising a variable resistor electrically connected between the power source and to the charging port wherein a microcontroller controls the variable resistor.

3. The first switch of claim 1 further comprising a timer set for a predetermined time interval that activates the first switch to allow the power to the charging port during the predetermined time interval before turning the first switch off or lowering current to the charging port.

4. The first switch of claim 3 further comprising an early stop setting or a pause setting of the predetermined time interval.

5. The article of furniture of claim 1 further comprising a detect switch as said first switch or electrically connected to said first switch wherein the detect switch detects the connection of the first device to the charging port.

6. The detect switch of claim 5 being located either at the charging port or at a distal end of a charging cable wherein the charging cable is connected to the charging port.

7. The article of furniture of claim 1 further comprising a current monitor electrically connected to the switch and that measures current directed to the charging port.

8. The article of furniture of claim 1 further comprising a microcontroller that is electrically connected to the first switch and controls the first switch.

9. The article of furniture of claim 8 further comprising components comprising a timer module, a detector module, a current monitor module, a convertor, a variable resistor, a data processor, a diagnostic circuit, a data port, and/or a wireless data port where each component is electrically connected to the microcontroller and wherein the microcontroller controls and/or communicates to each component.

10. The article of furniture of claim 8 further comprising a battery in said power source, a monitoring system that monitors a voltage of the battery, and a notification system that is connected to the monitoring system, wherein the monitoring system activates the notification system when the voltage of the battery reaches a threshold, and the notification system sends a notification to the microcontroller to activate the first switch to limit the power to the charging port.

11. The microcontroller of claim 8 electrically connected to a microphone receiver wherein the microphone receiver comprises a microphone, and the microcontroller is configured to receive and process voice commands that activate the first switch.

12. The article of furniture of claim 1 wherein said power source further comprising a battery.

13. The article of furniture of claim 12 further comprising a monitoring system that monitors the capacity of the battery and a notification system that is connected to the monitoring system, and when the battery capacity is less than a threshold, and the monitoring system signals the notification system to notify a user of the battery capacity.

14. An article of furniture comprising:

a. a power source;

b. a charging port electrically connected to the power source, wherein the charging port is configured to connect to a first device and the charging port is configured to provide power to the first device;

c. a first switch located between the power source and the charging port, wherein the first switch is configured to be actuated to prohibit quiescent loss when the charging port is not in use;

d. a second device connected to the power source, and comprising a second switch located between the power source and the second device and controlling current from the power source to the second device, and the second device comprising a motor for actuating a portion of the article of furniture; or a heating or cooling device for refrigeration, a cup holder, and/or a seat, or a light comprising an LED, an aesthetic lighting feature, a lamp, or a status indicator, or a video display, an audio speaker, a camera, a covert security camera, an LED infrared camera, a microphone, a voice command receiver, a computing device, a wireless communication device for transmitting or receiving wireless signals and/or WiFi extender, or further comprising a biomonitoring device comprising a blood pressure machine, a heart rate machine, an oxygen saturation measuring device, or a body weight device, or an at least one additional charging port with each additional charging port having its own individual power switch to turn off the power to its respective additional charging port and/or a master power switch for controlling all the power to all the charging ports;

e. the first switch is configured to control the power to only the charging port and to not limit the power to any other electrical devices and the second switch configured to control the power to only the second device and the second switch to not limit the power to the charging port; and f. a charging power supply electrically connected to the power source and to the charging port wherein said charging power supply is a DC-DC converter that converts a first DC voltage inputted from the power source to a second DC voltage outputted the charging port wherein said first switch limits the power from the power source to the charging power supply.

15. The article of furniture of claim 14 further comprising a resilient material located on a region having an original shape and configured to allow a placement of the first device, and the placement of the first device on top of the region resulting in the region losing the original shape and becoming flattened under a weight of the first device, and removal of the first device from the region allowing the region to expand back to its original shape.

16. The article of furniture of claim 14 wherein the second switch and the first switch differ in at least one physical property comprising size, shape, material, color, lighting, texture, and/or location.

17. The first switch of claim 14 further comprising a timer wherein activation of the first switch allows the power to the charging port for a predetermined time interval.

18. The first switch of claim 17 further comprising an override setting that stops the timer before an end of predetermined time interval.

19. The predetermined time interval of claim 17 set according to a time required to substantially charge the first device or adjustably set the timer based on a charge time of the first device estimated through a capacity monitor that is connected to the first device that measures a voltage capacity of the first device, and a current monitor that measures current at the charging port, and a microcontroller connected to the timer, to the capacity monitor, and to the current monitor, and the microcontroller estimating charge time of the first device and setting the predetermined time interval on the timer.

20. The article of furniture of claim 14 further comprising a detector connected to the charging port wherein the detector detects the connection or current consumption of the first device and either acts as the charging port switch or activates the charging port switch to limit the power to the charging port.

21. The detect switch of claim 20 further comprising a sensor switch either at the charging port or at a distal end of a charging cable wherein the charging cable is connected to the charging port.

22. An article of furniture comprising:
 a. a battery;
 b. a charging port electrically connected to the battery wherein the charging port is configured to connect to a first device and to provide power to a first device;
 c. a first switch located in the electrical connection between the battery and the charging port, wherein the first switch is configured to be actuated to prohibit quiescent loss when the charging port is not in use;
 d. a motor connected to at least one portion of the article of furniture and configured to actuate the at least one portion of the article of furniture;
 e. the motor being electrically connected to the battery and a second switch located in the electrical connection between the battery and the motor, wherein the second switch controls the power from the battery to the motor,
 f. the first switch configured to limit the power to only the charging port, while not limiting the power to the motor; and
 g. a charging power supply electrically connected to the battery and to the charging port wherein said charging power supply is a DC-DC converter that converts a first DC voltage inputted from the battery to a second DC voltage outputted to the charging port wherein the first switch limits the power from the battery to the charging power supply.

23. The article of furniture of claim 22 comprising a microcontroller electrically connected to the first switch and configured to activate the first switch.

24. The article of furniture of claim 23 further comprising a voltage monitor of the battery, and the voltage monitor of the battery being electrically connected to the microcontroller.

25. The microcontroller of claim 24 automatically turning off the first switch upon the voltage monitor detecting a voltage fault condition which indicates a voltage lower than a threshold voltage.

26. The microcontroller of claim 25 further electrically connected to a notification system comprising a light indicator, an audible alert, a vibrational alert, or a wireless module wherein the microcontroller sends a notification upon the voltage monitor detecting the voltage fault condition.

27. The wireless module of claim 26 sending the notification to a user's remote device about the voltage fault condition and configured to receive a command from the user's remove device to activate the microcontroller to turn off the first switch.

28. The microcontroller of claim 23 electrically connected to a microphone receiver wherein the microphone receiver comprises a microphone, and the microcontroller is configured to receive and process voice commands that activate the first switch.

29. The first switch of claim 22 further comprising a timer wherein activation of the first switch allows the power to the charging port for a predetermined time interval.

30. The first switch of claim 29 further comprising an override setting that stops the timer before the end of predetermined time interval.

31. The predetermined time interval of claim 29 set according to a time required to substantially charge the first device or adjustably set the timer based on a charge time of the first device estimated through a capacity monitor that is connected to the first device that measures a voltage capacity of the first device, and a current monitor that measures current at the charging port, and a microcontroller electrically connected to the timer, to the capacity monitor, and to the current monitor, and the microcontroller configured to estimate the charge time of the first device and to set the predetermined time interval on the timer.

32. The microcontroller of claim 31 being electrically connected to a battery capacity monitor, and the battery capacity monitor configured to measure a battery capacity and communicate battery capacity information to the microcontroller, and the microcontroller configured to send a notification containing information about the battery capacity upon receiving the battery capacity information from the battery capacity monitor.

33. The microcontroller of claim 32 adjusting the charge time of the first device by accounting for a remaining battery capacity and setting a time that does not result in a discharge of the battery to below a minimum threshold battery capacity.

34. An article of furniture comprising:
 a. a power source;
 b. a charging port wherein the charging port is electrically connected to the power source and wherein the charging port is configured to provide power to a first device;
 c. a first switch located in the electrical connection between the power source and the charging port, wherein the first switch is configured to be actuated to prohibit quiescent loss when the charging port is not in use while not limiting the power to a second device;
 d. the second device electrically connected to the power source and a second switch located in the electrical connection between the power source and the second device, wherein the second switch controls the power from the power source to the second device and the second switch does not limit the power to the charging port;
 e. a microcontroller electrically connected to the first switch and to the second device,
 f. a communication circuit electrically connected to the microcontroller;
 g. the communication circuit capable of sending notifications and/or receiving commands from to a remote device, h. the first switch configured to limit the power to only the charging port and to not limit the power to the second device; and i. a charging power supply electrically connected to the power source and to the charging port wherein said charging power supply is a DC-DC converter that converts a first DC voltage from the power source to a second DC voltage outputted to the charging port wherein said first switch limits the power from the power source to the charging power supply.

35. The microcontroller of claim 34 electrically connected to a monitor that detects power consumption at the charging port, and the monitor configured to provide information about the power consumption to the microcontroller, and the microcontroller configured to send a notification to the user's remote device containing the information about the power consumption.

36. The microcontroller of claim 34 electrically connected to a microphone receiver wherein the microphone receiver comprises a microphone, and the microcontroller configured to receive and process voice commands through the microphone and microphone receiver to activate the first switch.

37. The communication circuit of claim 34 further comprising a wireless receiver and wireless transmitter.

38. The article of furniture of claim 34 wherein the microcontroller is further electrically connected to a monitor that gathers status information about a component connected to the microcontroller, and the microcontroller configured to store the status information and to send stored data that contains the status information to a remote device.

39. The article of furniture of claim 38 wherein the remote device is a remote network comprising a series of devices including a server and one or more user's devices wherein the user's devices are configured to receive data from the server and configured to transmit a command to control the furniture to the server, wherein the server is configured to send the command to the communication circuit.

40. The article of furniture of claim 39 wherein the data includes a unique identifier that identifies origin of the data, wherein the origin of the data is the article of furniture or a component of the article of furniture, and the unique identifier is used by the server to determine which user's device receives the data.

41. A method of managing power on an article of furniture comprising steps of:

a. connecting a first device to a charging port or a cable electrically connected to the article of furniture wherein the charging port or cable is electrically connected to a power source, and the power source is electrically connected to a second device, and the article of furniture further comprises a first switch that is located between the charging port or cable and the power source, wherein the first switch is configured to be actuated to prohibit quiescent loss when the charging port is not in use, and the charging port electrically connected to an indicator wherein said indicator indicates when the power is being supplied to the charging port, wherein the article of furniture further comprising a charging power supply electrically connected to the power source and to the charging port wherein said charging power supply is a DC-DC converter that converts a first DC voltage inputted from the power source to a second DC voltage outputted to the charging port wherein said first switch limits the power from the power source to the charging power supply;

b. actuating the first switch to enable the power to be supplied to the charging port and activating the indicator;

c. powering the first device after the first switch is enabled for a time interval; and d. actuating the first switch to stop or reduce the power to the charging port, and e. activating a second device through a second switch, wherein the second switch is located between the power source and the second device, wherein the second switch controls the power from the power source to the second device and the second switch does not control the power to the charging port.

42. The method of claim 41 further comprising a step of activating a timer wherein the timer is connected to the first switch, and the timer is activated when the first switch is enabled, wherein the timer keeps the first switch enabled for the time interval which is a predetermined time interval.

43. The method of claim 42 further comprising a step of activating an early stop switch wherein the early stop switch is connected to the timer and/or the first switch and the early stop switch stops the timer from keeping the first switch enabled prior to an end of the predetermined time interval.

44. The method of claim 41 wherein the step of actuating the first switch further comprises a detect switch wherein the detect switch is configured to be the first switch or integrally actuating the first switch wherein connecting the first device to the charging port activates the first switch or removing the first device from the charging port deactivates the first switch.

45. A recliner, comprising:

a. a battery, b. a control panel located on an outer surface of the recliner, comprising c. a charging port electrically connected to the battery, wherein the charging port is configured to connect to a first device and to provide power to a first device, d. a first switch located in the electrical connection between the battery and the charging port, wherein the first switch is configured to be actuated to prohibit quiescent loss when the charging port is not in use, e. a power indicator, and f. a motor connected to at least one portion of the recliner and configured to actuate the at least one portion of the recliner, g. wherein the motor being electrically connected to the battery, and the first switch configured to limit the power to only the charging port to prohibit quiescent loss of the power in the charging port when the first device is fully charged or the first device is not connected to the charging port, and the first switch is not configured to limit the power to the motor; and h. a second switch configured to limit the power to only the motor and not limit the power to the charging port.

* * * * *